United States Patent [19]
Brice, Jr. et al.

[11] Patent Number: 5,414,851
[45] Date of Patent: May 9, 1995

[54] METHOD AND MEANS FOR SHARING I/O RESOURCES BY A PLURALITY OF OPERATING SYSTEMS

[75] Inventors: Frank W. Brice, Jr., Hurley; Joseph C. Elliott, Hopewell Junction; Kenneth J. Fredericks; Robert E. Galbraith, both of Poughkeepsie; Marten J. Halma, Poughquag; Roger E. Hough, Highland; Suzanne M. John, Poughkeepsie; Paul A. Malinowski, Poughkeepsie; Allan S. Meritt, Poughkeepsie; Kenneth J. Oakes, Wappingers Falls; John C. Rathjen, Jr., Rhinebeck, all of N.Y.; Martin W. Sachs, Westport, Conn.; David E. Stucki; Leslie W. Wyman, both of Poughkeepsie, N.Y.

[73] Assignee: International Business Machines Corporation, Armonk, N.Y.

[21] Appl. No.: 898,867

[22] Filed: Jun. 15, 1992

[51] Int. Cl.⁶ ............................................. G06F 3/00
[52] U.S. Cl. .................................... 395/650; 395/275; 364/DIG. 1; 364/280; 364/281.6; 364/281.3
[58] Field of Search .................. 395/650, 700, 275

[56] References Cited

U.S. PATENT DOCUMENTS

| | | | |
|---|---|---|---|
| 4,084,224 | 4/1978 | Appell et al. | 364/200 |
| 4,253,145 | 2/1981 | Goldberg | 395/500 |
| 4,564,903 | 1/1986 | Guyette et al. | 364/200 |
| 4,843,541 | 6/1989 | Bean et al. | 364/200 |
| 4,885,681 | 12/1989 | Umeno et al. | 395/375 |
| 4,967,342 | 10/1990 | Lent et al. | 364/200 |
| 5,170,472 | 12/1992 | Cwiakala et al. | 395/275 |
| 5,251,317 | 10/1993 | Iizuka et al. | 395/650 |
| 5,297,262 | 3/1994 | Cox et al. | 395/325 |

FOREIGN PATENT DOCUMENTS 0301275 1/1989 European Pat. Off. ....... G06F 9/46

Primary Examiner—Kevin A. Kriess
Attorney, Agent, or Firm—Bernard M. Goldman

[57] ABSTRACT

Provides a method for increasing the connectivity of I/O resources to a multiplicity of operating systems (OSs) running in different resource partitions of a computer electronic complex (CEC) to obtain sharing of the I/O resources among the OSs of the CEC, including channels, subchannels (devices), and control units (CUs). The invention provides image identifiers (IIDs) for assigning resources to the different OSs. Each shared I/O resource has a sharing set of control blocks (CBs) in which a respective CB is assigned to (and located by) a respective IID of one of the OSs. Each of the CBs in a sharing set provides a different image of the same I/O resource. The different CB images are independently set to different states by I/O operations for the different OSs, so that the OSs can independently share the same I/O resource.

30 Claims, 16 Drawing Sheets

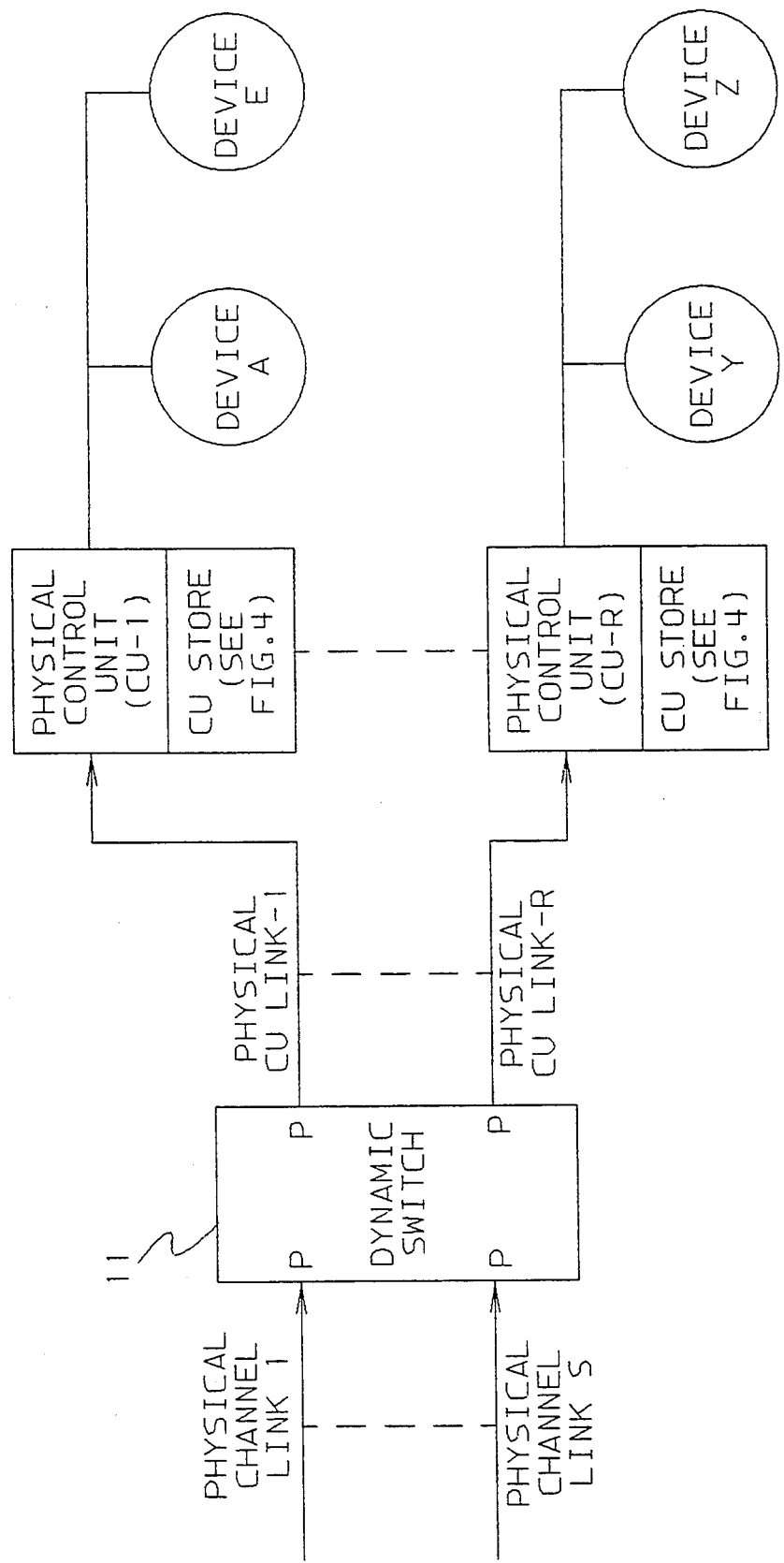

FIG. 4

| LOGICAL CU ADDRESS | CU PORT # | IID | PHYSICAL CU LINK ADDRESS | PHYSICAL CHANNEL LINK ADDR |
|---|---|---|---|---|
| ALLEGIANCE INDICATORS, PGID, AND CONTROLS FOR I/O DEVICE A ||||||
| ⋮ ||||||
| ALLEGIANCE INDICATORS, PGID, AND CONTROLS FOR I/O DEVICE E ||||||

FIG. 5

FRAME HEADER (FROM CEC)

| START OF FRAME DE-LIMITER (SOF) | PHYSICAL CU LINK ADDRESS | LOG. CU ADDR | PHYSICAL CHANNEL LINK ADDRESS | IID | LINK CTRL FIELD | DEVICE LEVEL CTRL FIELD | DEVICE ADDR |
|---|---|---|---|---|---|---|---|

DESTINATION: PHYSICAL CU LINK ADDRESS, LOG. CU ADDR
SOURCE: PHYSICAL CHANNEL LINK ADDRESS, IID

FIG. 6

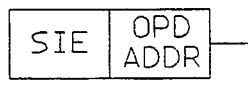

STATE DESCRIPTOR (SD)

| GUEST MS ORIGIN | | GUEST MS EXTENT | |
|---|---|---|---|
| ZONE REL.NO.(AZRN) | | INTERRUPTION AREA | |
| SQ (G.PEND. I/O IRPT) | D (SEL.DISABLE I/O IRPT) | INTERCEPTION AREA | I (ICPT. CODE) |
| ZONE 0 | ZONE 1 | ALERTING ZONE MASK(AZM) | ZONE N |
| ZONE MODE | EXECUTION CTRL AREA(ECA) | | ALERTING MODE |
| AZN OF CURRENT ALERT | | | |
| XA OR 370 MODE | GUEST PSW | | |
| ISC 0 | GUEST I/O IRPT ENABLE MASK(GIEM) | | ISC 31 |
| ZONE INTERRUPTION NO.(IZIN) | | IID | |

FIG. 7

START SUBCHANNEL INSTRUCTION

| SSCH OP CODE | | B2 | D2 |
|---|---|---|---|

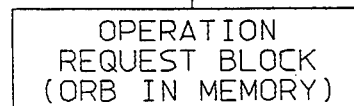

OPERATION REQUEST BLOCK (ORB IN MEMORY)

NON-PASSTHRU OPERAND (HYPERVISOR)

| GR1 | IID | | SCH NO. |
|---|---|---|---|

PASSTHRU OPERAND

| GR1 | 0 | | SCH NO. |
|---|---|---|---|

FIG. 8

(IID) OPERATING SYSTEM NO.

| | 0 | 1 | 2 | ..... | N |
|---|---|---|---|---|---|
| P | CHCB(P-0) | CHCB(P-1) | CHCB(P-2) | ..... | CHCB(P-N) |
| ⋮ | ⋮ | ⋮ | ⋮ | | ⋮ |
| 9 | | | | | |
| 8 | | | | ..... | |
| 7 | | | | | |
| 6 | | | | | |
| 5 | CHCB(5-0) | CHCB(5-1) | CHCB(5-2) | ..... | CHCB(5-N) |
| 4 | CHCB(4-Q) | | | | |
| 3 | CHCB(3-Q) | | | | |
| 2 | CHCB(2-Q) | | | | |
| 1 | CHCB(1-Q) | | | | |
| 0 | CHCB(0-Q) | | | | |

CHANNEL CONTROL BLOCKS (CHCBs) IN I/O SUBSYSTEM STORAGE

↑ CHPID NUMBER

NOTE: Q=IID OF ZERO (HYPERVISOR) OR IID OF OS CHCB IS ASSIGNED TO

CCB (CONFIGURATION CONTROL BLOCK)

IID ⟶ 0 1 2 3 · · · · N

CHCB (CHANNEL CONTROL BLOCK)

| CHPID | IID | | | |
|---|---|---|---|---|
| U | C | P | A | S |

U=UNSHARED/SHARED INDICATION
C=VARIED ONLINE/OFFLINE INDICATION
P=PERMANENT ERROR INDICATION
A=CANDIDATE INDICATION
S=SUPPRESSED INDICATION
NOTE: IID & CHPID LOCATE CHCB

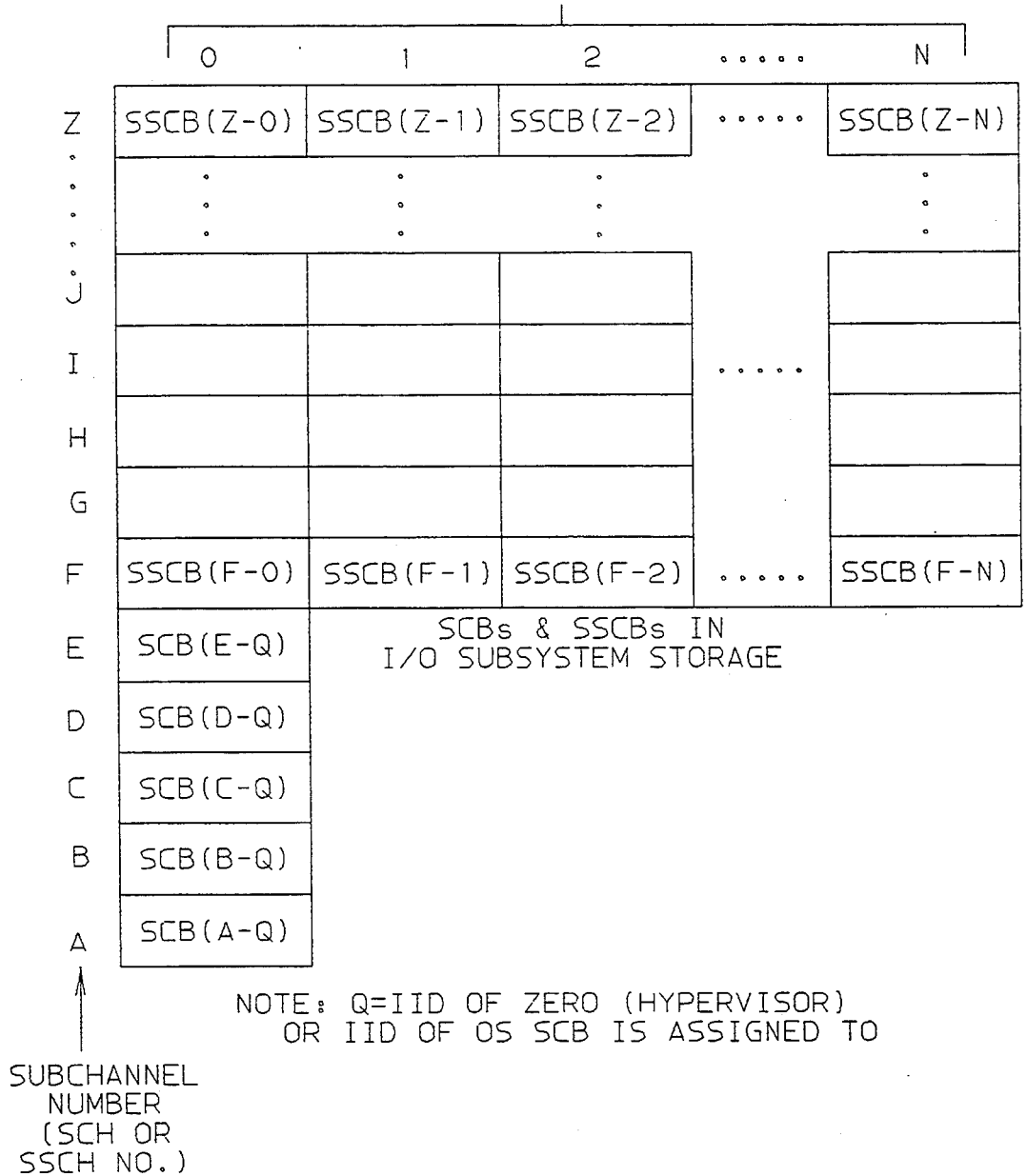

FIG. 12

SHARED SUBCHANNEL CONTROL BLOCK (SSCB)

| # | | | | | | | | | | | |
|---|---|---|---|---|---|---|---|---|---|---|---|
| 0 | INTERRUPTION PARAMETER ||||||||||||
| 1 | 00 | ISC | 000 | E | LM | MM | D | T | V | DEVICE NUMBER |||
| 2 | LPM ||| PNOM ||| LPUM ||| PIM |||
| 3 | MBI |||||| POM ||| PAM |||
| 4 | CHPID-0 ||| CHPID-1 ||| CHPID-2 ||| CHPID-3 |||
| 5 | CHPID-4 ||| CHPID-5 ||| CHPID-6 ||| CHPID-7 |||
| 6 | 00000000 ||| 00000000 ||| 00000000 ||| 00000000 || S |
| | IID ||| CHAIN POINTER |||||| QID |||
| | INCB ||| SSCB NUMBER |||||| DB || ALLEG |
| | LCUCB # || DEVICE ADDRESS (FOR FRAME) ||||||||||

NOTE: IID & SSCB NUMBER LOCATE SSCB

FIG. 14

LOGICAL CONTROL UNIT CONTROL BLOCK (LCUCB)

| | | | | | | | | | |
|---|---|---|---|---|---|---|---|---|---|
| V | IID | LOGICAL CU ADDRESS ||| LCUCB NUMBER ||||||
| | | | | | CU BUSY QUEUE COUNT |||||
| TOP OF QUEUE POINTER ||||||||||
| BOTTOM OF QUEUE POINTER ||||||||||
| SUMMATION OF QUEUE COUNTS ||||||||||
| SUMMATION OF ENQUEUES ||||||||||
| CHPID-0 ||| CHPID-1 ||| CHPID-2 || CHPID-3 ||
| CHPID-4 ||| CHPID-5 ||| CHPID-6 || CHPID-7 ||

ASSOC WITH CHPID 0:
| B | E | R | S | L | | PHYSICAL CHANNEL LINK ADDRESS | PHYSICAL CU LINK ADDRESS |
|---|---|---|---|---|---|---|---|
| SWITCH BUSY COUNT |||||||||
| CONTROL UNIT BUSY COUNT |||||||||
| SUCCESS COUNT |||||||||

⋮

ASSOC WITH CHPID 7:
| B | E | R | S | L | | PHYSICAL CHANNEL LINK ADDRESS | PHYSICAL CU LINK ADDRESS |
|---|---|---|---|---|---|---|---|
| SWITCH BUSY COUNT |||||||||
| CONTROL UNIT BUSY COUNT |||||||||
| SUCCESS COUNT |||||||||

NOTE: IID & LCUCB NUMBER LOCATE THE LCUCB

FIG. 13

(IID) OPERATING SYSTEM NO.

| LCUCB # | 0 | 1 | 2 | ..... | N |
|---|---|---|---|---|---|
| K | LCUCB(K-0) | LCUCB(K-1) | LCUCB(K-2) | ..... | LCUCB(K-N) |
| ... | ... | ... | ... | | ... |
| 9 | | | | | |
| 8 | | | | ..... | |
| 7 | | | | | |
| 6 | | | | | |
| 5 | LCUCB(5-0) | LCUCB(5-1) | LCUCB(5-2) | ..... | LCUCB(5-N) |
| 4 | LCUCB(4-Q) | | | | |
| 3 | LCUCB(3-Q) | | | | |
| 2 | LCUCB(2-Q) | | | | |
| 1 | LCUCB(1-Q) | | | | |
| 0 | LCUCB(0-Q) | | | | |

LOGICAL CONTROL UNIT CONTROL BLOCKS (LCUCBS) IN I/O SUBSYSTEM STORAGE

↑ LOGICAL CONTROL UNIT CONTROL BLOCK NUMBER (LCUCB #)

NOTE: Q=IID OF ZERO (HYPERVISOR) OR IID OF OS LCUCB IS ASSIGNED TO

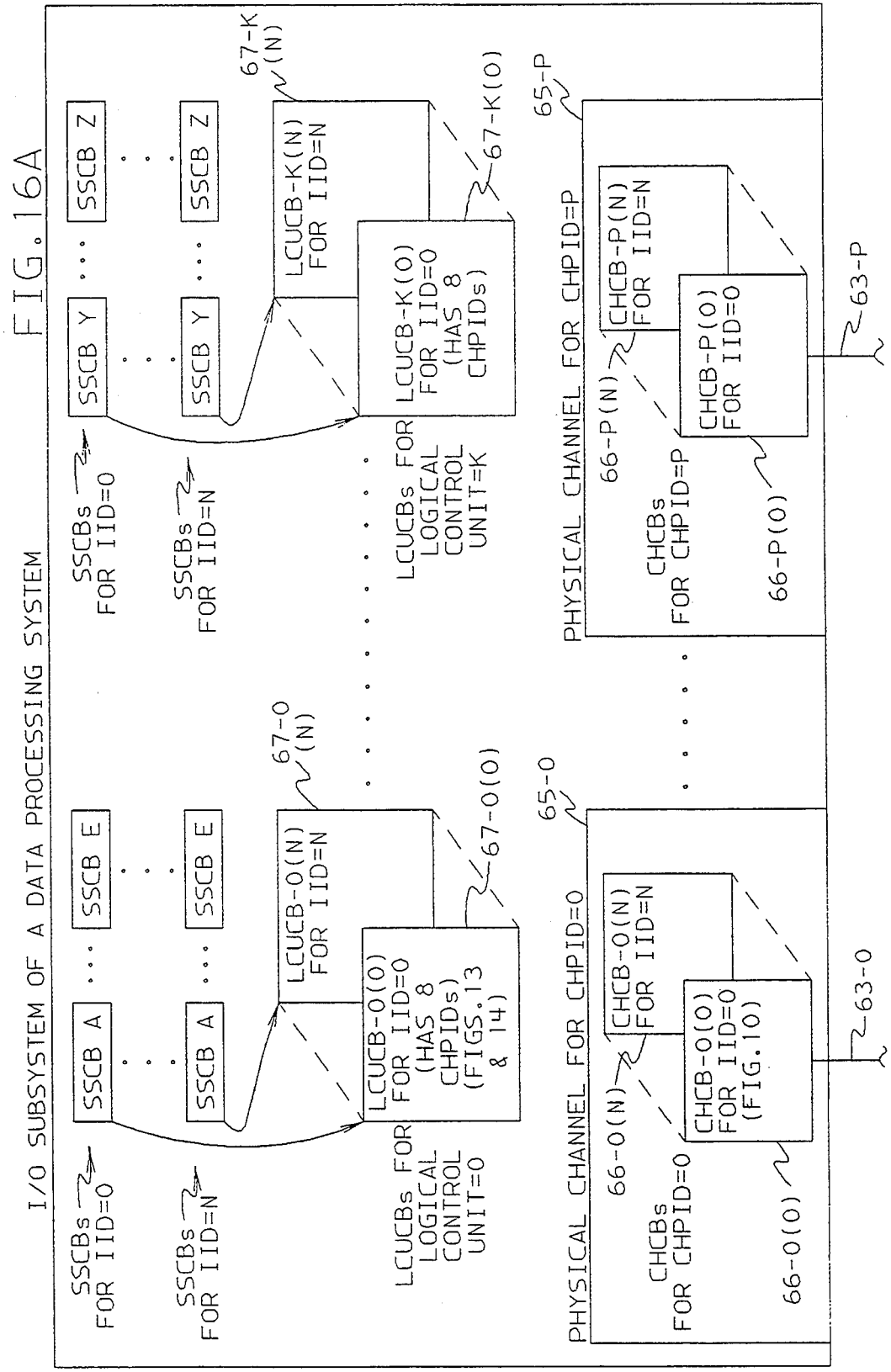

GENERAL REGISTER 1 WITH RCHP FOR THE HYPERVISOR

CRW PRESENTED TO THE HYPERVISOR

METHOD AND MEANS FOR SHARING I/O RESOURCES BY A PLURALITY OF OPERATING SYSTEMS

INCORPORATION BY REFERENCE

The entire contents of the following USA patent applications, filed on the same day as the subject application, are incorporated by reference into this specification: application Ser. No. 07/898,623, now U.S. Pat. No. 5,265,240, (PO9-92-026), entitled "Channel Measurement Method And Means" by R. E. Gailbraith et al; application Ser. No. 07/898,977 (PO9-92-028), entitled; "Asynchronous Command Support For Shared Channels For A Computer Complex Having Multiple Operating Systems" by M. P. Brown et al; application Ser. No. 07/898,875 (PO9-92-029), entitled "Pass-Thru For I/O Channel Subsystem Call Instructions for Accessing Shared Resources In A Computer System Having A Plurality Of Operating Systems" by K. J. Fredericks et al.

Also the following prior-filed applications assigned to the same assignee as the subject application have their entire content incorporated by reference into this specification: application Ser. No. 07/444,190, filed Nov. 28, 1989, by C. J. Bailey et al, entitled "Method And Apparatus For Dynamically Managing I/O Connectivity" (Docket Number KI989013); application Ser. No. 07/754,813, filed Sep. 4, 1991, by R. Cwiakala et al, entitled "Establishing Synchronization Of Hardware And Software I/O Configuration Definitions" (Docket Number PO991036); application Ser. No. 07/676,603, filed Mar. 28, 1991, by S. M. Benson et al, entitled "Method And Apparatus For Dynamic Changes To System I/O Configuration" (Docket Number PO990026); application Ser. No. 07/755,246, filed Sep. 5, 1991, by J. E. Bostick et al, entitled "Method And Apparatus For Dynamically Changing The Configuration Of A Logically Partitioned Data Processing System" (Docket number PO991028); application Ser. No. 07/693,997, filed Mar. 28, 1991, by R. Cwiakala et al, entitled "Dynamically Changing A System I/O Configuration Definition" (Docket Number PO991012); application Ser. No. 07/860,797 filed Mar. 30, 1992 by J. A. Frey et al, entitled "Management of Data Objects Used to Maintain State Information for Shared Data Objects" (Docket Number PO992004); and application. Ser. No. 07/860,646, filed Mar. 30, 1992 by D. A. Elko et al, entitled "Message Path Mechanism for Managing Connections Between Processors and a Coupling Facility" (Docket Number PO992006).

INTRODUCTION

This invention provides a method that greatly increases the effective number of I/O channels, devices and control unit images available to each of a plurality of operating systems (OSs) running on a CEC (computer electronic complex) without increasing the actual number of physical I/O resources. The invention enables the OSs to directly share physical I/O resources without intervention from a hypervisor.

BACKGROUND

In the prior art, either only physical I/O channel resources or only I/O device resources, but not both, were directly sharable by operating systems (OSs) executing in different logical resource partitions of a CEC (computer electronic complex) system. The OSs in a CEC are coordinated by a hypervisor, in which the processor and memory resources of the CEC have been divided among the separately executing OSs. The hypervisor may be structured in internal code (e.g. microcode) or in software. An example of an internal code type of hypervisor is the IBM PR/SM (processor resource/system manager), which coordinates resource contentions among independently executing OSs in separate logical resource partitions. An example of a software hypervisor is the IBM S/370 VM/MPG (virtual machine/multiple preferred guests) system, in which so-called virtual machines (called preferred guests) execute separate OSs in respective logical resource partitions divided by the system software in a software directory.

In prior systems, an I/O channel could be directly shared only by assigning each OS which shared the channel a mutually exclusive subset of I/O devices which could be accessed via that channel. When this technique was used, a single subchannel existed to represent each I/O device, and this subchannel was assigned to the OS which was assigned the corresponding device. Because it is often desired to have I/O devices shared by plural OSs, this technique was very limiting.

In prior systems, an I/O device could be directly shared only by assigning each OS which shared the device a mutually exclusive subset of I/O channels which could be used to access that device. When this technique was used, a plurality of subchannels existed to represent each I/O device, and one of these subchannels were assigned to each OS which shared the device. Each subchannel representing the same device was identified by a different subchannel number. Because each I/O channel was assigned to a single OS with this technique, the number of channels needed would usually increase with the number OSs which were to share I/O devices. This commonly presented a problem since the quantity of channels was limited to 256 due to the 8-bit number which was used to identify them. The quantity of subchannels was less of a problem since the quantity of subchannels had a higher limit of 65536 due to the 16-bit number which was used to identify them.

It was possible in prior systems to share, but not directly share, both I/O devices and the I/O channels used to access these devices. However, this involved a large amount of inefficient system overhead due to the need to intercept to the hypervisor code for each I/O operation in order that the hypervisor could coordinate resource contentions. While the hypervisor code was executing on behalf of the OS, the OS was suspended.

In practice, the overhead of using the hypervisor to obtain sharing of both I/O devices and the I/O channels used to access these devices was so inefficient that most often the choice was made to directly share either only I/O channels or only I/O devices. This allowed all I/O operations for the OS to be performed without hypervisor involvement. This direct use of I/O resources by an OS is called "I/O passthru" because these I/O operations "passthru" (i.e. bypass) the hypervisor.

In the prior art, a System/390 (S/390) CEC has an I/O channel subsystem having one or more I/O processors (IOPs) to control a plurality of I/O channel processors (CHPRs) in the CEC for controlling a like number of channels, which may be fiber optic channels or parallel wire channels connecting to I/O control units with I/O devices. These are the channels involved in the previously discussed hypervisor and OS control. A widely used type of fiber optic channel uses the IBM ESCON architecture. The CEC consists of one or more central processors (CPUs), system memory, and the I/O subsystem. All of these parts of a CEC are included in the CEC resources used by programs executing in the CEC.

A control unit is the conduit for the exchange of information between an I/O device and a channel. Similarly a channel is the operating system's conduit for the exchange of information between main storage and an I/O device.

An IBM publication (form number SA22-7202) published October 1990 entitled "ES Architecture 390 ESCON I/O Interface" describes the then existing ESCON channel/control unit path connections.

The various resources in the CEC are divided among the OSs by using a plurality of directories or state descriptors (SDs) in system memory that respectively assign the CEC resources to the OSs executing in the respective resource partitions. The CEC hypervisor may be allocated its own logical resource partition to control the overall operation of the CEC, including the dispatching of OSs on the central processors (CPUs) in the CEC, and resolving conflicts among the OSs. Each OS controls the dispatching of application programs running under the respective OS, usually without hypervisor involvement (unless an exception occurs).

Early hypervisor systems required the hypervisor to control all I/O operations for all OSs in the CEC (e.g. early VM/370), including having the hypervisor assign all channel operations, start all subchannels for all I/O devices in the CEC, and handle all I/O interruptions from the devices for all programs running under the OSs.

U.S. Pat. No. 4,843,541 (PO9-87-002) entitled "Logical Resource Partitioning of a Data Processing System", assigned to the same assignee as the subject application, describes and claims a system having "I/O passthru" to enable each OS in a CEC to handle its own I/O operations using dedicated I/O channels and devices without involving the hypervisor. This passthru (or passthrough) feature allowed each OS to start I/O operations requested by application programs running under the OS, and to handle the I/O interruptions resulting from such I/O start operations. The hypervisor only needed to intercept an OS I/O operation when an exception condition occurred. That invention is used in the IBM PR/SM LPAR and S/370 VM MPG systems.

U.S. patent application Ser. No. 07/752,149 (PO9-91-035) filed on Aug. 29, 1991, entitled "CPU Expansive Gradation of I/O Interruption Subclass Recognition", assigned to the same assignee as the subject specification, enables a significant increase in the number of logical resource partitions and CPUs in a CEC. This application enabled each of the CPUs in a CEC (executing any OS running in the CEC) to handle all of the I/O interruption subclasses available in the system; this avoided a prior constraint that restricted each OS to only handling interruptions for one of the I/O interruption subclasses available in the system.

A subchannel is specified for each I/O device supported by an OS under the IBM S/390 architecture. A SCHIB (subchannel information control block), stored in system memory when the S/390 Store Subchannel Instruction (STSCH) is executed, is the means for an OS to view its resources for a subchannel, including the set of channels usable by the subchannel. Each SCHIB contains fields for up to eight channel identifiers, called channel path identifier (CHPID) values, each of which specifies a channel which can be selected for use by the subchannel. An available one of the specified CHPIDs is selected for each data transmission request of the subchannel which is not busy at the time of a subchannel request. In prior systems where I/O devices were directly shared but each channel used to access these devices were assigned to a single OS, the SCHIB could only specify a channel as available when that channel was assigned to the OS.

In prior S/370 and S/390 computer systems, each channel was represented by a single "channel control block" (CHCB) in a CEC's I/O subsystem storage. And each subchannel was also represented by a single subchannel control block (SCB) in the CEC's I/O subsystem storage. An SCB was used by the I/O subsystem internal code (microcode) to select one of up to eight channels specified for the SCB for accessing the I/O device represented by the SCB (the channel assignments of the SCB were the same as in a corresponding SCHIB). Each SCB was assigned to one and only one OS in the CEC. Therefore the assigned OS was the only OS which could access the subchannel corresponding to the SCB using passthru to improve system efficiency (by avoiding hypervisor intervention in managing the I/O operation). No other OS could directly use the subchannel.

In prior systems where I/O devices were directly shared but each channel used to access these devices were assigned (dedicated) to a single OS, an adverse consequence was that when a dedicated channel was utilized only a small percentage of time by its assigned OS, the channel could not be dynamically switched to another OS using passthru; only non-passthru hypervisor accessing (non-direct sharing) was available with its resulting inefficiencies. Consequently, dedicated channels generally remained under-utilized. (The available manual switching of a channel to a different OS did not permit dynamic online switching of an I/O channel to another OS.)

Limiting the number of channels to each OS had the effect of limiting the I/O data rate available to the OS by restricting the number of simultaneous parallel paths for data transmission.

Prior to invention of logical channel paths for the IBM ESCON I/O Interface architecture, a physical relationship existed between either a System/370 or 370-XA channel and an attached I/O control unit and its associated I/O devices. That is, a plurality of physical ports on a control unit were respectively connected to different channels, associating a different channel with each port. Each channel associated with a port was assumed by the control unit to be used by a different OS unless a special command was received from two or more of these channels binding them into a channel path group for the same OS. The channel path group included channel paths connecting the same operating system to the plurality of ports of a CU, and the group was assigned a path group identifier (PGID).

Dynamic switching between channels and control units U.S. Pat. No. 5,107,489 (PO988011), issued Apr. 21, 1992, entitled "Switch And Its Protocol For Making Dynamic Connections", was provided by the ESCON I/O Interface architecture. Dynamic switching allowed a plurality of channels to connect to a single port on a control unit, instead of each channel requiring a connection to a different port. These channels could be on the same CEC or different CECs. Dynamic switching also allowed a plurality of control unit ports to connect to a single channel.

U.S. patent application Ser. No. 07/576,561, filed Aug. 31, 1990, entitled "Logical Channel Paths In A Computer I/O System" (Docket Number PO990015), assigned to the same assignee as the subject application, describes the invention of logical channel paths. The ESCON I/O Interface architecture eliminated the prior requirement for a channel-to-port connection by the invention of logical channel paths. The concept of logical channel paths made it possible for the control unit to uniquely recognize any of the plural channels to which one of its ports could be dynamically connected. It also made it possible for the channel to uniquely recognize any of the plural control unit ports to which it could be dynamically connected. The control unit continued to assume that each channel capable of connecting to one of its ports was to be used by a different OS unless a special command was received from two or more of these channels binding them into a channel path group for the same OS. The channel path group included logical channel paths connecting the same operating system to the plurality of ports of a CU, and the group was assigned a path group identifier (PGID).

With logical channel paths, each channel and control unit port is assigned a link address. For each channel capable of being connected to a particular control unit port, a unique identifier (physical channel link address) is assigned, which when passed to a control unit port uniquely identifies the channel with respect to that control unit port. For each control unit port capable of being connected to a particular channel, a unique identifier (physical CU link address) is assigned, which when passed to a channel uniquely identifies the control unit port with respect to that channel.

The ESCON I/O Interface architecture also provided for the capability to have a plurality of logical control units exist within a physical control unit. The ESCON I/O architecture calls these logical control units "control unit images", however, herein they are called "logical control units". A logical control unit provides the functions and has the logical appearance of a control unit. When plural logical control units do not exist within a physical control unit, a single logical control unit is said to exist in the physical control unit. Connections between a particular channel and control unit port could be used for some or all of the logical control units which existed in a physical control unit. In order to identify the logical control unit within a physical control unit, a unique identifier (logical CU address) was assigned to each logical control unit.

In each frame header sent by a channel to a logical control unit, the channel identified the destination control unit port by including the physical CU link address in the destination link address field of the frame and identified the destination logical control unit by including the logical CU address in the destination logical address field of the frame. The channel also included its physical channel link address in the source link address field of the frame so that the logical control unit could identify the channel which sent the frame. In each frame header sent by a logical control unit to a channel, the logical control unit identified the destination channel by including the physical channel link address in the destination link address field of the frame. The logical control unit also included both the physical CU link address in the source link address field of the frame and the logical CU address in the source logical address field of the frame so that the channel could identify the control unit port and logical control unit which sent the frame.

By placing the proper link and logical addresses in the appropriate source and destination fields of each frame header, the communicating channel and logical control unit are uniquely identified to each other. It was the combination of the physical channel link address, physical CU link address, and logical CU address which uniquely identified a single logical channel path, with respect to either a physical channel or a control unit port.

Before communication to an I/O device associated with a logical control unit can take place, the establishment of a logical path (LP) is required. The establishing of a logical path is a means for the channel and logical control unit to agree that a particular logical channel path is allowed by both entities to be used for purposes such as transmission of commands, data, and status related to an I/O device. The procedure for establishing a logical path is called the "establish-logical-path procedure". A logical path was uniquely identified by the combination of the physical channel link address, physical CU link address, and logical CU address, with respect to either a physical channel or a control unit port.

SUMMARY OF THE INVENTION

The subject invention significantly increases the number of images of I/O channels, devices (represented by subchannels), and control units directly sharable by a plurality of operating systems (OSs) in a computer electronic complex (CEC) without requiring an increase in the actual number of physical channels, devices or control units connected to the CEC. The OSs can directly share all these physical I/O resources without intervention from a hypervisor.

The subject invention also significantly increases the number of images of I/O channels, devices (represented by subchannels), and control units available to each OS in a multi-OS CEC system without requiring an increase in the actual number of physical channels, physical devices or physical control units connected to the CEC.

A CEC which supports this invention may be said to support a multiple image facility (MIF).

The subject invention may significantly increase the maximum data rate available to each OS in a multi-OS CEC system without requiring an increase in the actual number of channels or devices connected to the CEC. The I/O data rate of an OS is dependent on the parallelism of data transfer to/from the OS. Increasing the number of channels available to each OS can increase the number of I/O devices which can be simultaneously transmitting data to the OS, which can correspondingly increase the maximum data rate available to the OS.

Increasing the parallelism, flexibility and connectivity of channels and I/O devices to each OS (by increasing the number of channels and I/O devices available to the OS) can more quickly obtain different types of data for an OS, even when this does not increase the overall data transmission rate for the OS. The I/O demands of multiple users of an OS are better served by increasing the number of channels and devices connectable to each OS.

Direct control by each of plural OSs over sharable channels and devices by this invention increases system efficiency by avoiding hypervisor intervention. Thus, where previously passthru could not be used for all.

OSs which shared both I/O devices and the I/O channels used to access these devices, this invention is the means which provides this capability.

The great effective increase in I/O channels provided by this invention can easily be expressed using the following example: If a prior CEC had 7 OSs and 84 unshared channels, then each OS had an average of 12 (=84/7) dedicated channels. With this invention, all 84 channels can be made directly sharable by each of the 7 OSs (while still being able to directly share the devices accessible by these channels) so that any OS may now use up to all 84 channels. Accordingly, the number of channels available to any OS has increased from 12 to 84, which is a 700 percent increase in this example.

Of course, any sharable channel may only be active on behalf of one OS at a time, because the channel is usable for an OS only when it is not in a busy state by another OS. In prior CECs, when a channel was dedicated to one OS, it could not be used by any other OS when it was not busy. But with this invention, a sharable channel in a non-busy state can be directly used by another OS, and can be dynamically switched for direct use between different OSs. Thus, a non-busy shared channel may be switched dynamically among plural OSs—whenever needed by any sharing OS. Plural simultaneous requests to a non-busy channel by sharing OSs result in one of the requesting OSs getting the use of the channel and the other requests remaining queued.

Likewise, any sharable device may only be active on behalf of one OS at a time, because the device is usable for an OS only when it is not in a busy state by another OS. In prior CECs, when a device was dedicated to one OS, it could not be used by any other OS when it was not busy. But with this invention, a sharable device in a non-busy state can be directly used by another OS, and can be dynamically switched for direct use between different OSs. Thus, a non-busy shared device may be switched dynamically among plural OSs—whenever needed by any sharing OS. Plural simultaneous requests to a non-busy device by sharing OSs result in one of the requesting OSs getting the use of the device and the other requests remaining queued.

The invention provides a novel method of sharing I/O channels, control units, and devices by a number of different OSs by physically providing multiple control blocks for the respective use by the OSs, each of which specifies a shared resource to an OS, and may be said to represent an image of the resource to each sharing OS. Thus, a sharing set of control blocks for a sharable resource may respectively specify an image of a resource to each sharing OS. A sharing set may represent a single physical channel, a single control unit, or a single subchannel representing a physical I/O device, to plural OSs in a CEC. When plural logical control units exist within a physical control unit, a different sharing set may represent each logical control unit. A sharable channel may access different sharable logical control units and sharable I/O devices. Likewise, a sharable logical control unit may be accessed by different sharable channels.

Each image of each channel, subchannel, or logical control unit is represented in the I/O subsystem by use of a hardware or micro-programming constructs, herein called "channel control blocks" (CHCBs), "sharable subchannel control blocks" (SSCBs), and "logical control unit control blocks" (LCUCBs), respectively. The CHCBs, SSCBs, and LCUCBs are all located in the I/O subsystem storage of the CEC.

All control blocks in a sharing set define the SAME I/O resource. For example, all CHCBs in a sharing set define the same channel to each sharing OS. Each control block in a sharing set is assigned to a different OS by means of a novel "image identifier" (IID). The hypervisor may also be assigned a control block in a sharing set. In the preferred embodiment, IID=0 is assigned to the hypervisor, and the non-zero IIDs are assigned to OSs.

The IID values and the OSs in a CEC need not have a one-to-one correspondence when using this invention. It would be possible for an OS to be assigned more than one IID for its use. But a one-to-one correspondence between an IID value and OS in a CEC is used in the preferred embodiment.

In the preferred embodiment, the IIDs are not visible to the OSs, but are for example, visible to the hypervisor, CPUs, I/O subsystem, and control units.

The IID and the resource number may or may not be designated by fields in each control block of a sharing set, since these values can be implied by the location of the control block in in a two dimensional array in a storage medium. Verification of these values is aided by storing them in respective fields in each control block, and these values are preferably checked in these fields whenever the control block is accessed.

If a sharable resource is selectable by OSs in more than one CEC, then the IID for each OS may be further qualified by storing a CEC identifier along with the IID, e.g. concatenating a unique CEC number with the IID used in the CEC (the IID needing be unique only within its CEC). IIDs need not be unique to a CEC in the preferred embodiment of the invention, however, a unique CEC number is not required due to the logical channel path addressing provided by the ESCON I/O Interface architecture.

The sharable resource identifier may be the resource identifier used in a current architecture, such as the IBM S/390 architecture's use of the "channel path identifier" (CHPID) for channel identification and "subchannel number" for I/O device identification.

A "sharing set" of control blocks used by this invention need not comprehend all OSs represented in the CEC. By not providing a valid control block for an OS in a sharing set, that OS is eliminated from accessing the resource represented by the sharing set, because that OS does not have a valid image of the resource. For example, one or more SSCBs in a sharing set may be missing (or marked invalid) to prevent some of the OSs in the CEC from accessing the device represented by that sharing set. Further, the channel fields in the different SSCBs in the same sharing set need not all specify an identical group of channels, e.g. some channels may be the same and some may be different in the different SSCBs of a set. However in the preferred embodiment of the invention, all OSs are represented in each sharing set for each sharable resource, and the same channel identifiers are specified in all blocks of a sharing set of SSCBs. However, some parameters may differ among the control blocks in a sharing set without spoiling their image capability.

In this invention, non-sharing resource control blocks (like those found in prior systems) may also be intermixed with sharable resources of the same type. Thus, a non-shared subchannel (SCB) may be used for an I/O device dedicated to a single OS, and sharable subchannels (SSCBs) may also be used for enabling passthru I/O operations by plural OSs to that device.

This invention is capable of operating with prior CEC resource partitioning architectures that permit OS programs executing different resource partitions of the CEC, such as in IBM PR/SM system (in which separated resources are defined in different logical partitions), or in the IBM S/370 VM MPG (Virtual Machine Multiple Preferred Guest) system (which uses software directories to defined different logical partitions). Either of these types of partitioned systems can perform I/O operations in a passthru mode which allows OSs to directly share an I/O channel or device (but not both) without any intervention from a CEC hypervisor (if no exception is encountered) to significantly shorten the time for I/O accessing. The I/O channels and devices cannot be both shared for direct accessing by an OS in passthru mode. In these prior systems, all channels and devices can only be accessed by the hypervisor; and hypervisor intervention is needed if OSs are to share both I/O devices and the channels used to access these devices, which is a very inefficient type of I/O operation compared to direct passthru operations by an OS.

The sharable channels used by this invention may provide bit-serial, bit-parallel or serial/parallel types of data transmission. The invention is preferably used with the serial I/O channel interface of the type described by the IBM Enterprise Systems Connection (ESCON) architecture because it has been found simpler to implement; but this invention may be used with other channel architectures. That is, the IBM ESCON I/O Interface architecture provides logical channel paths and logical I/O addressing capabilities for which this invention may be easier to implement.

This invention has found a way to increase the number of channels and subchannels available to each OS in a CEC without changing the size of the channel identifier (CHPID) value or of the subchannel identifier (subchannel number) value. With this invention, the effective number of channels and subchannels available to the OSs in a CEC is a multiple of the number of IIDs activated in the CEC.

And the maximum data rate available to any OS in a CEC is increased by this invention enabling a dynamic shifting on a demand basis in the use of any shared resource (e.g. channels, subchannels and logical control units) to whichever OS in the CEC needs its use. Dynamic shifting on a demand basis significantly improves the utilization of the channels in the CEC.

This invention expands the use of the source and destination address fields of each frame header, as provided by the ESCON I/O Interface architecture, to now include a novel use of the source logical address (for frames sent from a channel to a control unit) and destination logical address (for frames sent from a control unit to a channel). These new logical address fields in the frame header are used to identify either the image of the channel which sent a frame or the image of the channel to which the a frame is being sent. When the channel sends a frame header, it includes the IID for the corresponding channel image in the source logical address field of the frame. This identifies the channel image to the control unit. When a control unit sends a frame header, it includes the IID for the corresponding channel image in the destination logical address field of the frame. This identifies the channel image to the channel.

This invention expands the identification of a logical channel path and logical path (LP) to include the IID corresponding to a channel image. A single logical channel path or logical path is uniquely identified by the combination of the physical channel link address, physical CU link address, IID, and logical CU address, with respect to either a physical channel or a control unit port.

The IID need not be the actual value used in the frame header to identify the channel image. It would be possible to use another identifier which had a one-to-one correspondence with the IID. However, the IID value is included in the frame header in order to identify the channel image in the preferred embodiment.

With this invention, the IID in a frame header can be used for both shared and unshared channels. For unshared channels, a single channel image and a single channel control block are used (for the dedicated channel).

The information in each frame transferred through any physical channel is always restricted to the OS assigned the IID in the frame header. The frame is isolated from all other OSs (using a different IID in their frames), and the IID logic for supporting the images of a channel, subchannel, or logical control unit within a CEC maintains this restriction.

This invention also comprehends use of a dynamic channel switch (called a "director") to support multiple channel images by assigning multiple link addresses to all of the images of the shared channels within the I/O subsystem of a CEC, e.g. one link address per channel image. This is a non-preferred version of this invention for handling the images within a CEC, because the director does not know how many images of a channel a CEC supports or is currently configured with, and so would have to assign the maximum number to each channel, which would deplete the number of link addresses available and produce a more complex director port design in the director. This technique would also require the director to know which ports had channels attached and which of these were shared channels.

With the previously-summarized preferred form of this invention, a single port is required to attach either a shared channel or a unshared channel to a director and the director assigns a single link address to the physical channel. It is the IID included in the frame header which is used to uniquely identify the channel image of a physical channel.

BRIEF DESCRIPTION OF THE DRAWINGS

FIG. 3 shows physical channel links connecting to control units (CUs) through a dynamic switch.

FIG. 4 illustrates a "control unit logical path control block" (CULPCB) used in representing a logical path within a logical control unit in a memory used by the control unit.

FIG. 5 represents a frame header (containing logical path identifier components) transmitted by a CEC to an I/O control unit.

FIG. 6 represents a state descriptor (SD) control block of a SIE (start interpretive execution) instruction used for indicating the resources assigned to a partition in a computer electronic complex (CEC).

FIG. 7 represents a start subchannel (SSCH) instruction and its operands for use by an embodiment of the invention.

FIG. 8 is an example of an array containing channel control blocks (CHCBs) used in an embodiment of the invention.

FIG. 11 is an example of an array containing both non-shared subchannel control blocks (SCB) and shared subchannel control blocks (SSCB) used in an embodiment of the invention.

FIG. 12 illustrates an example of the content of an SSCB or SCB used in an embodiment of the invention.

FIG. 13 is an example of an array containing logical control unit control blocks (LCUCBs) used in an embodiment of the invention.

FIG. 14 illustrates an example of the content of a logical control unit control block (LCUCB) used in an embodiment of the invention.

FIG. 16A and FIG. 16B together show an integrated embodiment of the invention having different types of control blocks representing various types of IID-associated images for a plurality of operating systems.

DESCRIPTION OF THE DETAILED EMBODIMENTS

Computer Electronic Complex (CEC)

Figure 1:
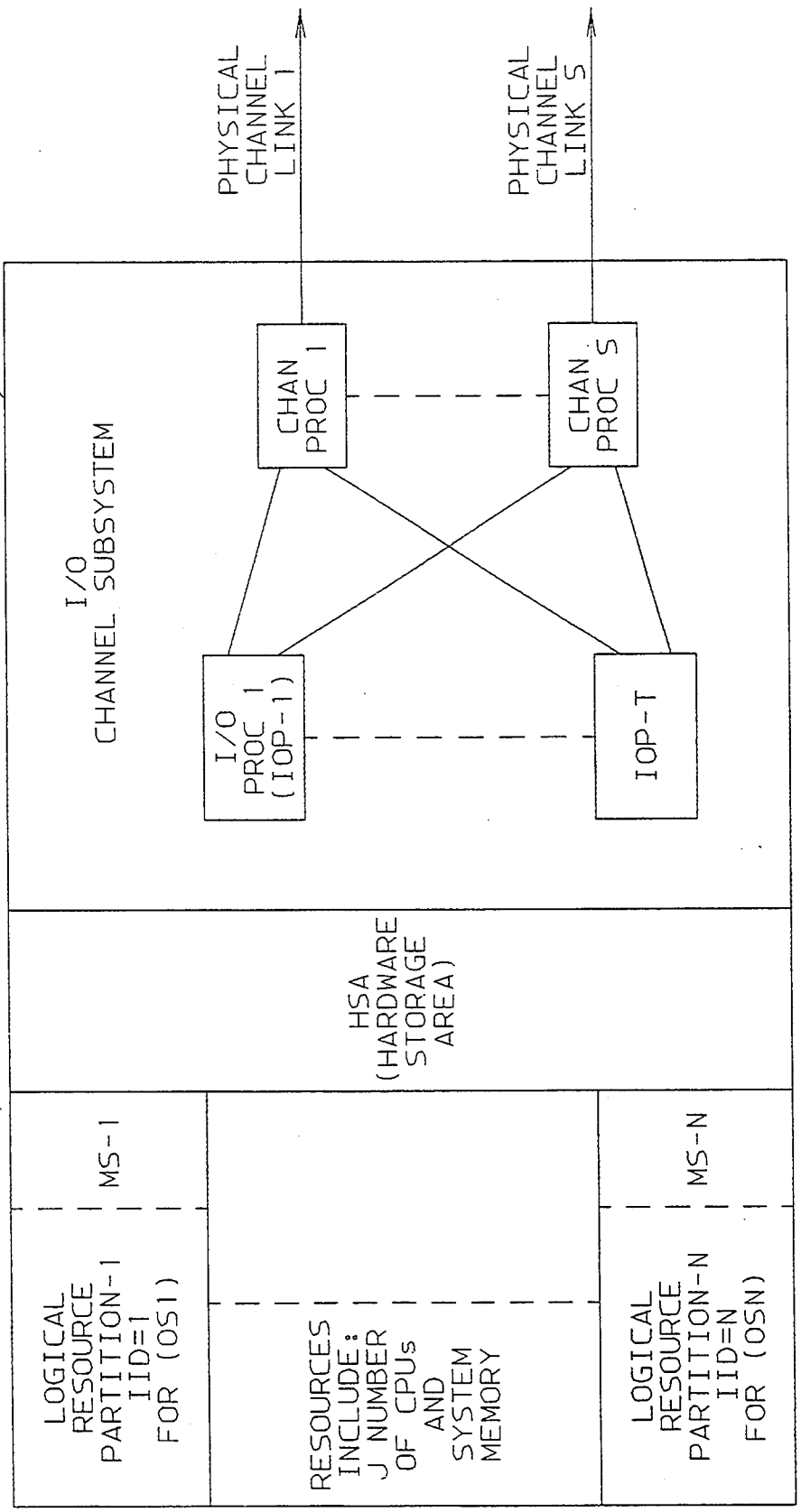
FIG. 1 illustrates a computer electronic complex (CEC) using the invention.

FIG. 1 shows a computer electronic complex (CEC) used with an embodiment of the invention. The CEC includes one or more central processors (CPUs), a system memory, caches and controls (not shown) of the type found in the prior art for interconnecting the CPUs to the system main memory, and an I/O subsystem. The CEC resources in FIG. 1 are configured into resource partitions 1 through N, which may be done in the manner described and claimed in U.S. Pat. No. 4,848,541 (previously cited herein).

Each of the N partitions in the CEC shown in FIG. 1 contains an operating system (OS), and a microcode hypervisor (such as the IBM PR/SM microcode hypervisor) controls the overall operation of the OSs. Alternatively, the CEC may contain a plurality of OSs that operate under a virtual machine (VM) software hypervisor. In either case, the CEC has N number of OSs simultaneously and independently executing under control of a hypervisor. The OSs may, for example, be copies of the IBM MVS and/or VM CMS systems.

The I/O subsystem in FIG. 1 includes I/O processors (IOPs) 1 through T, and channel processors (CHAN PROCs) 1 through S. The I/O subsystem may, for example, have up to 256 channel processors (when using an eight bit CHPID), and usually has a lessor number of IOPs. The IOPs remove the I/O requests received from the CPUs via an I/O work queue and select a channel processor for controlling the requested I/O operation. The number of IOPs is determined by whatever number can handle the I/O work load from the CPUs in a timely manner. Usually only a few IOPs are required, such as four IOPs, which are presumed in the preferred embodiment. The channel processors respectively control data transmissions on channels 1 through S, each of which may be a serial channel of the IBM S/390 ESCON type in the preferred embodiment.

This invention enables plural OSs simultaneously executing a plurality of I/O channel programs to directly and efficiently share the IOPs and I/O channels.

The sharing of the I/O resources utilizes three types of images of I/O resources, including I/O channel images, logical control unit images, and device images via subchannel images.

Each physical channel is represented by a sharing set of channel control blocks (CHCBs). The CHCBs are located in I/O subsystem storage. The I/O subsystem storage is preferably separate from (for protection from) CPU program addressable storage.

Each OS has a different "channel image" of the same physical channel. The different channel images of the same physical channel are represented by information in each of the CHCBs of the sharing set. Each channel image is defined herein by an OS identifier (IID) and a physical channel identifier (CHPID). The CHCB for a particular channel image can be located in I/O subsystem storage by its associated CHPID and IID values. Various characteristics for each of the channel images for the same physical channel are indicated by settings in the CHCBs for the respective channel images.

Figures 9, 10:
FIG. 9 illustrates an example of the content of a configuration control block (CCB) used to activate the IIDs which may be used by operating systems in a CEC.
FIG. 10 illustrates an example of the content of a channel control block (CHCB) used in an embodiment of the invention.

An image of the channel is used as a component in defining a logical path (LP) from a particular OS through the associated physical channel to a logical control unit (including through any I/O dynamic switch). A single logical path is uniquely identified by the combination of the physical channel link address, physical CU link address, IID, and logical CU address, with respect to either a physical channel or a control unit port. Different I/O channel programs operating under different OSs may be simultaneously executing by using different images of the same physical channel, although only one channel program can be transmitting commands, data, or status through the physical channel at any one time. FIGS. 8 and 10 show CHCBs, and show how they are organized in an array such that they can be located by CHPID and IID values.

Each subchannel is represented by a sharing set of shared subchannel control blocks (SSCBs). The SSCBs are located in I/O subsystem storage. The I/O subsystem storage is preferably separate from (for protection from) CPU program addressable storage.

Each OS has a different "subchannel image" of the same subchannel. The different subchannel images of the same subchannel are represented by information in each of the SSCBs of the sharing set. Each subchannel image is defined herein by an OS identifier (IID) and a subchannel identifier (subchannel number). The SSCB for a particular subchannel image can be located in I/O subsystem storage by its associated subchannel number and IID values. Various characteristics for each of the subchannel images for the same subchannel are indicated by settings in the SSCBs for the respective subchannel images.

Different I/O channel programs operating under different OSs may be simultaneously executing and sharing the same subchannel (the same device) by using different images of the same subchannel, although only one channel program can be accessing the device at any one time. FIGS. 11 and 12 show SSCBs.

Each logical control unit is represented by a sharing set of logical control unit control blocks (LCUCBs). The LCUCBs are located in I/O subsystem storage. The I/O subsystem storage is preferably separate from (for protection from) CPU program addressable storage.

Each OS has a different "logical control unit image" of the same logical control unit. The different logical control unit images of the same logical control unit are represented by information in each of the LCUCBs of the sharing set. Each logical control unit image is defined herein by an OS identifier (IID) and a logical control unit identifier (LCUCB number). The LCUCB for a particular logical control unit image can be located in I/O subsystem storage by its associated LCUCB number and IID values. Various characteristics for each of the logical control unit images for the same logical control unit are indicated by settings in the LCUCBs for the respective logical control unit images.

Different I/O channel programs operating under different OSs may be simultaneously executing and sharing the same logical control unit by using different images of the same logical control unit, although only one channel program can be transmitting commands, data, or status through a particular physical channel and control unit port at any one time. FIGS. 13 and 14 show LCUCBs.

Although this invention supports shared channels, shared control units, and shared subchannels, this invention also permits a CEC to have and be using unshared channels, unshared control units, and unshared subchannels (devices) while it is using the shared I/O resources. A particular channel, control unit, or subchannel may be changed from either unshared to shared, or from shared to unshared by dynamically or statically reconfiguring the CEC resource assignments.

The image concept of this invention allows only the OS associated with a particular image resource identifier (IID) to access information acquired with the use of that OS's image identifier. The use of shared resources by this invention need not affect the privacy of I/O information an OS accesses. That is, each OS sharing the same physical resources with other OSs maintains its security of I/O information from all other OSs sharing the resources. And no OS need view its IID or any other IID. In the preferred embodiment, the IIDs are not visible to the OSs, but are for example, visible to the hypervisor, CPUs, I/O subsystem, and control units.

Channel Paths to I/O Devices

Figure 2:
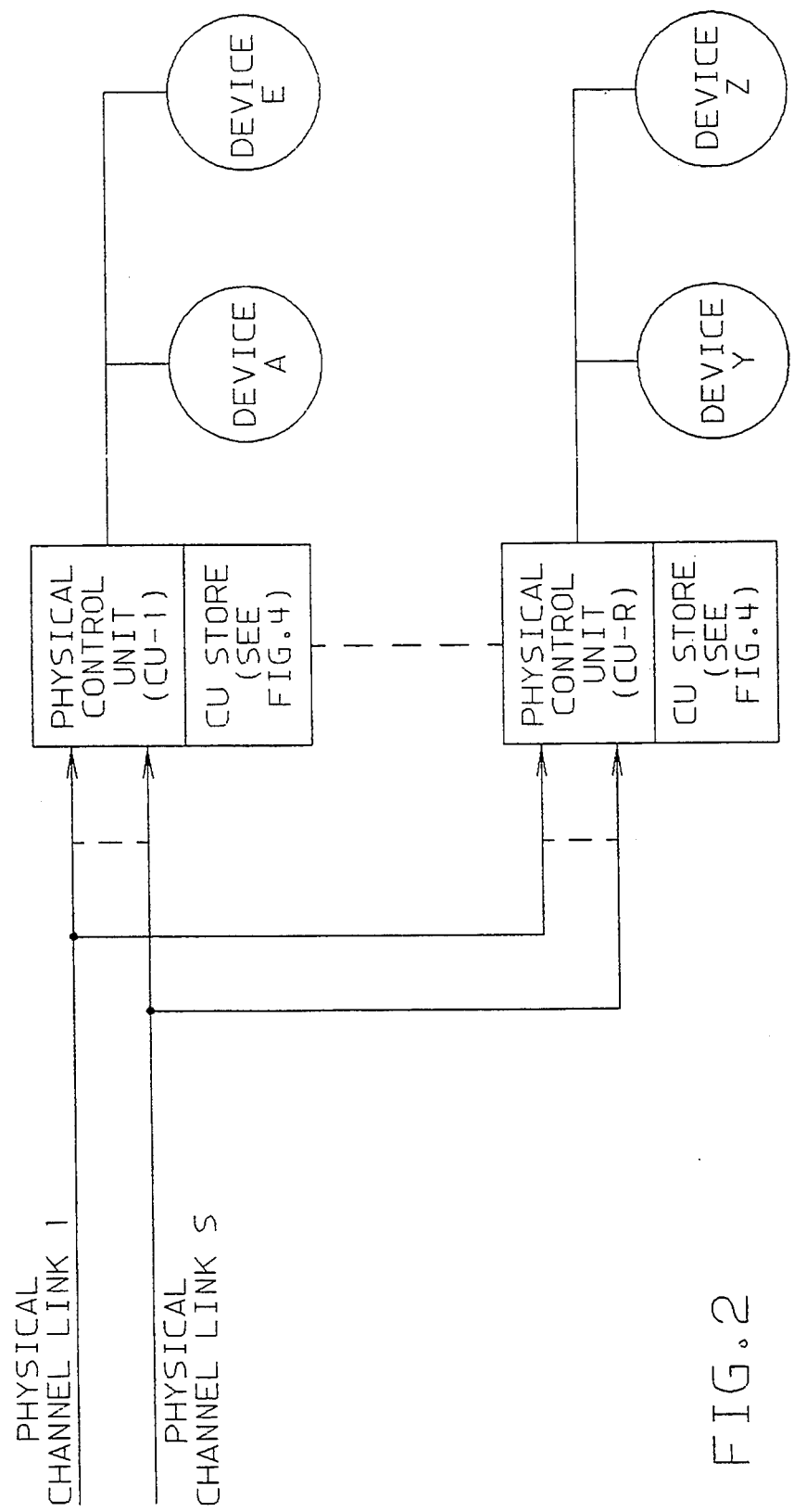
FIG. 2 shows physical channel links connecting directly to control units (CU) ports without going through a dynamic switch.

FIG. 2 illustrates a set of physical channel links from the CEC in FIG. 1. Concurrently executing channel programs in different OSs in the CEC may be using any single physical channel path to access the same or different I/O devices when using this invention. Any channel path may include elements such as any of the channels 1–S from the CEC to any of control units (CUs) 1 through R. These CUs connect to I/O devices A, E . . . Y, Z. Although channels 1–S are shown respectively connected to S number of ports on each CU, it should be understood that any CU may have anywhere from one to S number of ports. Each of the channels 1–S may be connected to a different port of a CU. And, some channels may not be connected to a particular CU.

FIG. 3 shows the same physical channel links 1–S connected through a dynamic switch 11 to the same control units (CUs) 1–R. The advantage of dynamic switch 11 is to obtain the same connectivity of channels to CUs (as was obtained in FIG. 2 without a dynamic switch), except that in FIG. 3 each CU has only a single port to which any of channels 1–R may be connected. Thus, the dynamic switch 11 eliminates the need for multiple CU ports to obtain flexible channel-to-CU connectivity. The CUs in FIG. 3 are assumed to connect to the same sets of I/O devices A, E . . . Y, Z as in FIG. 2.

FIGS. 2 and 3 are intended to show that the invention comprehends all manners of obtaining physical channel-to-CU paths, whether or not any dynamic switch is provided in the connection path, and whether or not the CUs have one or multiple ports. A dynamic channel switch is sometimes called a "director".

OS Image Identifier (IID)

One or more different "image identifiers" (IIDs) are assigned to each of the plural OSs executing in different resource partitions of the CEC in FIG. 1. In the preferred embodiment herein, one IID is assigned to each OS in a CEC.

Although assigned to OSs, in the preferred embodiment, the IIDs are not visible to the OSs. But for example, they are visible to the hypervisor, CPUs, I/O subsystem, and control units.

The IIDs are used to enable the plural OSs to share the physical I/O resources connectable to the CEC without decreasing the data security between the OSs. The new-found sharability provided by this invention enables up to all of the OSs in a CEC to share up to all of the I/O channels, up to all of the control units (both physical and logical) available to the CEC, and up to all of the I/O devices connected to the control units, without involving the hypervisor in the I/O operations.

The invention enables the OSs to use different images of the same channels, subchannels (representing I/O devices) and logical control units. The different images enable individual sharing and control by each OS of the same physical channel and/or of the same control unit (both physical and logical), and/or of the same physical I/O device.

Figure 16B:
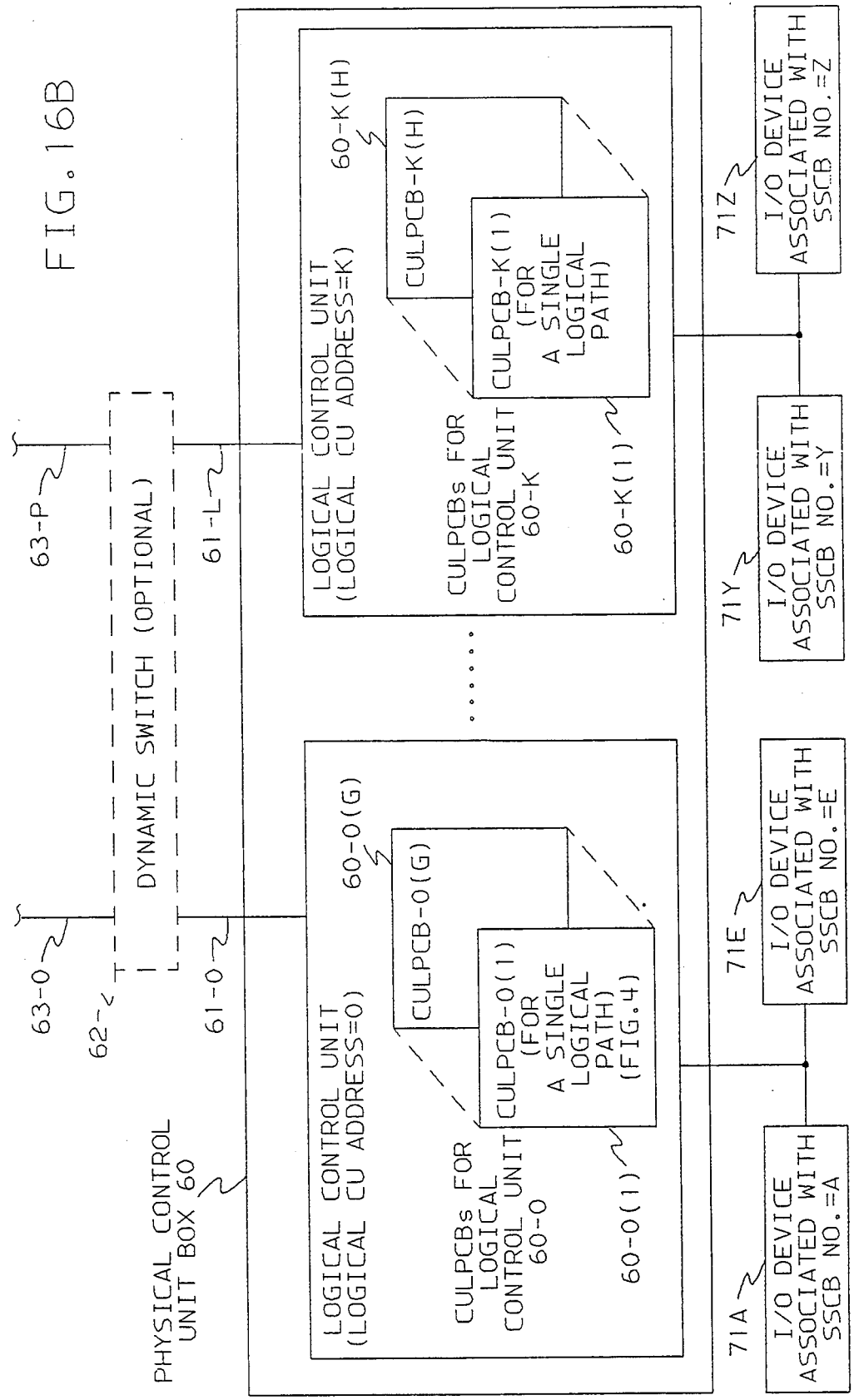

FIG. 16A represents an example of channel images, logical control unit images, and subchannel images by means of control blocks stored in a CEC's I/O subsystem storage. A control unit also has control blocks stored in I/O control unit storage which represent logical paths, as shown in FIG. 16B. It is the use of these control blocks by the I/O subsystem and the CU which permits the different OSs to access and directly share all the same I/O resources.

Multiple images of the same subchannel permit each OS to be connected (through an OS-related image of the same subchannel) to the same device.

Different OSs sharing a physical channel may asynchronously multiplex data through the same physical channel at different times to the same I/O device or to different I/O devices.

Each of the different channel images is represented by a channel control block (CHCB) in the I/O subsystem storage. The I/O subsystem storage is preferably in a memory area separate from system main storage, so that the I/O subsystem storage is not addressable by CPU instructions, but is addressable by internally coded (microcoded) instructions, and hardware. Examples of CHCBs are shown in FIGS. 8, 10 and 16A. There may be up to (N+1)*(P+1) of sharable CHCBs in I/O subsystem storage.

The preferred embodiment assigns a unique non-zero IID value to each OS in a CEC, and reserves the IID=0 value for assignment to the CEC hypervisor. The hypervisor may or may not actually be assigned any IID value.

The requirements of different hypervisors vary in relation to whether they need to be able to perform I/O operations on their own behalf. For example, if a software hypervisor is used, it should be able to share I/O devices with its OSs; and then a shared subchannel control block (SSCB) having an IID=0 may be provided in each sharing set of SSCBs for use by the hypervisor. Likewise, a CHCB and LCUCB having an IID=0 may be provided in each sharing set of CHCBs and LCUCBs, respectively. This allows a software hypervisor (such as VM/370 XA) to share I/O channels, CUs and devices with its OSs. On the other hand, if a microcode hypervisor is used (e.g. the hypervisor in the IBM PR/SM LPAR system), it need not share I/O resources with the OSs, in which case no SSCB, CHCB, or LCUCB for the hypervisor (having an IID=0 value). need be provided in each sharing set.

The preferred embodiment makes the IIDs transparent to all OSs in the CEC, and to all programs executing under the OSs. It is not necessary to have any OS, or OS program, be aware that IIDs are being used in the CEC, or that I/O resources are being shared by the OSs. Only the system hypervisor, CPUs, I/O subsystem, and control units need to be aware of IIDs and resource sharing. No OS needs to view or access any IID value, since the OS's IID value is automatically handled by the hypervisor, CPU, I/O subsystem, and control unit controls (including its system microcode and hardware operations) whenever an OS requests an I/O operation. And programs executing under any OS (e.g. in any logical partition or in any virtual machine in a CEC) need not be aware of the existence of IIDs.

IID Value Activation

FIG. 9 illustrates a configuration control block (CCB) in which the various IID numbers are activated or inactivated for use by the CEC operations. A bit position is provided for each possible IID value from zero up to a maximum. A bit position corresponding to a particular IID value is set to a one state to activate that IID value, or is set to a zero state to indicate an inactive state for that IID value.

If each IID is represented by an 8-bit number, it allows up to 255 non-zero values, of which, for example, 63 may be activated and assigned to OSs of a resource-partitioned CEC. The IIDs could be specified by a larger or smaller number, and more than one IID could be assigned to any OS, although in the preferred embodiment there is only one IID assigned to any OS.

No requirement exists for the activated IID values to start at any given value or be in a dense range of IID values. For example, an implementation could provide a set of four active IID values such as 0, 2, 7, and 8 for four associated OSs.

Assignment of an IID to an OS

An IID is assigned to an OS by storing the IID value in a hypervisor control block, called a SD (state description) which is the operand of a SIE (start interpretive execution) instruction, executed only by the hypervisor for dispatching any OS. An exemplary form of an SD is shown in FIG. 6. A respective SD is provided in system main storage for each OS operating under the hypervisor in order to define the subset of CEC resources available to each OS. Accordingly, an IID is assigned to an OS when the assigned IID value is stored in the IID field in the SD assigned to the respective OS. The SDs are not accessible to the OSs in this embodiment.

When an I/O command is issued by any OS, the OS's IID is usually required in the execution of the command. The hypervisor or microcode accesses the IID in the SD, and microcode controlling the execution of the command for the respective OS, applies the IID for the current OS command without the OS having any access to the IID. The microcode locates and accesses any required CHCB, SSCB, and/or LCUCB to select any channel, subchannel, or logical control unit images required for performing the OS command, setting up any required logical path (LP) specification, generating a frame header (containing all addresses required at the CU), and transmitting the frame packet on the selected physical channel path to the CU for accessing a requested I/O device (also addressed in the frame header). The CU stores the communicated LP specification (including its IID) for use by the CU when the CU later must respond to the request (after performing the requested command).

Channel Images (CHCBs)

Images of each channel are provided by channel control blocks (CHCBs) which are used in association with other control blocks. Each physical channel is identified by a respective CHPID number.

Not all of the channels need to be shared, and in FIG. 8, channels corresponding to CHPIDs 0 through 4 are not shared and are assigned to either the hypervisor (IID=0) or one of the OSs (IID other than zero). Any number, including all or none, of the channels may be shared. In FIG. 8, the channels having CHPIDs higher than 4 are shared by all N OSs and CHPIDs 0 through 4 are not shared.

Each CHPID may have a plurality of channel images (CHCBs) up to the number of IIDs (equal to the number of OSs). Each of the channel images independently represents a physical channel to a respective OS, so that the OSs can independently operate the physical channel. That is, each OS which uses a particular physical channel has its own channel image different from the channel images of the other OSs for the same physical channel. Thus, each channel image for any OS may have states different from, and independent of, the channel image of any other OS for the same physical channel.

FIG. 8 shows an example of an array of CHCBs 0(0)–P(N) that represent all channel images for all physical channels in a CEC. The respective CHCBs are indexed (located) in the array by their assigned CHPID, which is written into the first field of each CHCB in the preferred embodiment in which each CHPID is represented by an eight bit number that limits the maximum number of CHPIDs (and the corresponding number of channels in a CEC) to 256. (Note: this example is not the array of CHCBs shown in FIG. 16A in which only CHCBs for shared channels are shown.)

Structure of an CHCB

FIG. 10 shows the content of a CHCB (which is also the content of the CHCBs used in FIG. 16A). The first row in each CHCB contains the value of the CHPID represented by the respective CHCB. An IID field contains the IID assigned to this CHCB. These two values, the CHPID and IID, together locate any CHCB in the I/O subsystem storage, where they are used for accessing any CHCB in the channel operations. Other fields in each CHCB are:

U: Unshare/shared indication indicates if the channel is being unshared (dedicated to one OS), or is shared by a plurality of OSs.

C: Varied online/offline indication which indicates if the respective channel image is varied online where it can be operational, or varied offline where it cannot be operational but where it can be serviced for a maintenance operation.

P: Permanent Error: Indicates whether the channel image is currently in a permanent error condition or not.

A: Candidate: Indicates whether the channel image is permitted to be varied online.

S: Suppressed: Indicates whether new I/O activity may be initiated for the channel image.

There may be other fields (not shown) in each CHCB, in addition to these defined fields which are not unique to the CHCBs in this specification.

The following (and many other) scenarios are possible in the states of these novel channel images for the same or different physical channels:

a) Shared channel images for OSs 1, 2 and 3 are varied online.

b) The channel image for OS 1 is varied offline and is not operational, while the channel images for OS's 2 and 3 are varied online and are concurrently performing I/O operations.

c) A momentary error condition has occurred in the physical channel which causes the channel images for OS's 2 and 3 to be placed in the permanent error state. (The channel image for OS 1 is offline, as varied by the previous step).

d) In order to again use its channel image, OS 2 varies its channel image offline, and then varies the channel image online which cures the error condition and makes the channel image error-free. This results in the three channel images ending up in a different state: The OS 1 channel image is offline; the OS 2 channel image is online and error-free, and the OS 3 channel image is online and in permanent error.

Other Control Blocks per Channel

Other control blocks are used in the operation of the channels, such as for example, a "reverse lookup control block" (RLCB) associated with each CHCB. The RLCB lists each subchannel which can use a respective physical channel.

If there is a channel assignment variation in the subchannel images (SSCBs for the same sharing set), in which some subchannels in the sharing set can use a particular channel and other subchannels in the same sharing set may not, such variation might also be listed in the RLCB. (However, the preferred embodiment herein assigns the same channels (CHPIDs) to all SSCBs in the same sharing set).

Subchannel Images (SCBs and SSCBs)

This invention provides a set of subchannel images for each subchannel by means of a "sharing set" of SCBs, herein called "sharing SCBs" (SSCBs). The SSCBs in a sharing set are respectively assigned to different IIDs (representing different OSs). The novel concept of a sharing set enables up to all OSs in a CEC to access the same device (because the same subchannel number, representing the same device, is assigned to all SSCBs in the same sharing set).

FIG. 11 shows an example having both sharing sets of SSCBs and non-shared SCBs. Each box in FIG. 11 represents an SSCB or an SCB. They are arranged vertically in FIG. 11 according to subchannel numbers A to Z, in which the subchannel numbers correspond to the I/O devices in FIGS. 2 and 3. Subchannel numbers A-E represent only non-shared SCBs. Each of the subchannel numbers F-Z represent a sharing set of SSCBs. As previously stated, each subchannel is assigned to a different I/O device.

The top row in FIG. 11 indicates the OS ownership of the SSCBs. Each column is respectively assigned a different IID from 0 to N to indicate the OS ownership of the SSCBs in the respective column. In column IID=0, the SSCBs belong to the hypervisor, since IID=0 is assigned to the hypervisor in the preferred embodiment.

Accordingly, each of the subchannel numbers A-E locates a non-shared SCB assigned to either the hypervisor (IID=0) or one of the OSs (IID other than zero). And each of the subchannel numbers F-Z is assigned to a sharing set of SSCBs for enabling its represented I/O device to be shared by the hypervisor and by each of the OSs having IIDs 1-N. The shared device will also share one or more channels when the same CHPIDs are specified in each of the SSCBs in the sharing set, as is done in the preferred embodiment herein.

Although each of the SSCBs in a sharing set may be considered to provide a "subchannel image" of each other, because they all apply to the same subchannel, these SSCBs only represent "complete subchannel images" of each other when they all have the same CHPID (channel) assignments.

A sharing set may contain "partial subchannel images" when some SSCBs in the sharing set do not have all of the CHPIDs specified in other SSCBs in the set. But a sharing set supports "shared channels" when two or more SSCBs in the sharing set have the same CHPID to enable different OSs to share the same channel when accessing the I/O device represented by the sharing set.

In the preferred embodiment herein, every SSCB in the same sharing set has the same CHPIDs, but different sharing sets have different sets of CHPIDS, although they may have some or all CHPIDs in common.

Structure of an SSCB

Figure 15:
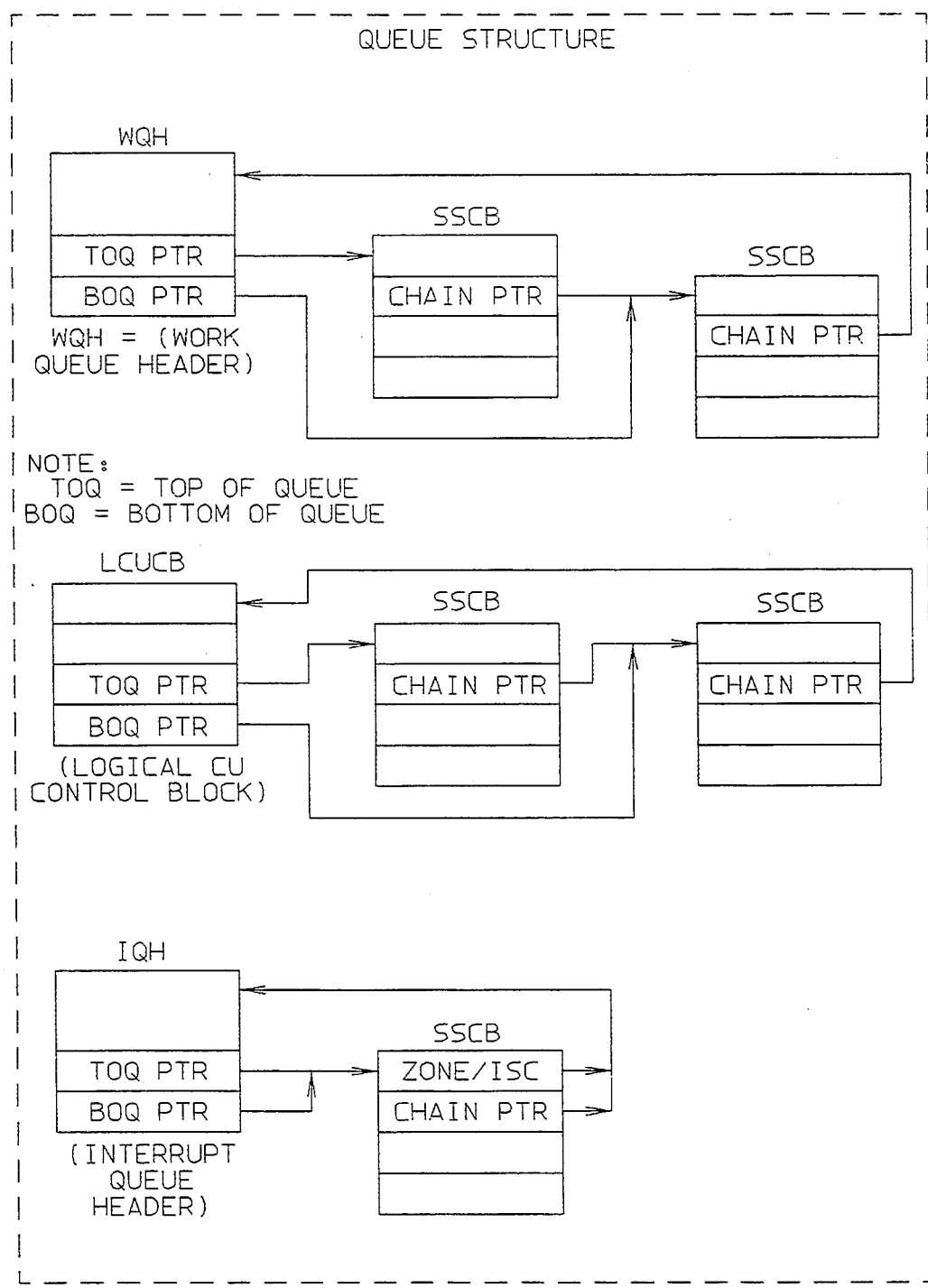
FIG. 15 represents a working queue (WQH), a control unit image queue (using a LCUCB as a header), and an interruption queue (IQH) used by an embodiment.

FIG. 12 shows the content of each SSCB and SCB shown in FIG. 11 (SSCBs and SCBs are identical in field structure and differ in whether or not they are used in sharing sets). Some of the fields in the illustrated SSCB/SCB content are identical to fields in the SCHIB (subchannel information block) found in the prior S/390 architecture. However, novel fields provided in the SSCB/SCB herein include an IID field, a chain pointer field, a QID field, an I/O interpretation control bit field (INCB), LCUCB number field, and an SSCB number field, which are defined as follows:

a. The INCB (I/O interpretation control bit) field indicates whether the subchannel image is enabled for instruction and interruption interpretation or not.

b. The chain pointer field in the SSCB allows it to be chained into any of several types of queues which perform a function used for selecting SSCBs, such as a "start subchannel work queue" and a "device interruption queue", such as the queues shown in FIG. 15.

c. The QID field content specifies a particular queue containing the SSCB (which applies to the pointer value in the chain pointer field).

d. The IID field contains the assigned IID value.

e. The LCUCB number field contains the logical control unit identifier of the LCUCB associated with the SSCB. The LCUCB number and IID fields are used in combination to locate the associated LCUCB in I/O subsystem storage.

f. The SSCB number field contains the related SSCB (or SCB) value.

The IID field and the SSCB number field contents are provided for verification checking. The values in these fields are implied by the location of the respective SSCB in the array shown in FIG. 11 (so theoretically these values are not needed to specify the SSCB or SCB).

The SSCB number field is required by this invention to contain the same SSCB number in every SSCB in the same sharing set.

The other fields in the SSCB/SCB shown in FIG. 12 may be the same as the fields defined in the prior art SCHIB in the ESA/390 Principles of Operation (previously cited herein), and they may also be provided in each SSCB. However, some of these fields found in the prior SCHIB are used in a novel manner by this invention, such as the following:

A valid field V indicates if the image represented by the SSCB is valid and may be used; if invalid, the represented image of the device cannot be accessed by the assigned OS (represented by its assigned IID). However, the same device may be accessed by other OSs having valid images of the same subchannel indicating by a valid state (having their valid bit=1, but assigned different IIDs). Hence, the V bit in each subchannel image can be set to either one or zero in order to allow only selected OSs to request I/O operations of the corresponding I/O device.

In the preferred embodiment each SSCB or SCB contains fields for up to eight CHPIDs (CHPID-0 to CHPID-7), which allows the device represented by a SCB or SSCB to be accessed through any of up to eight different channels represented by these CHPIDs. When a device is being selected for a communication operation (such as when a device is being started or is being reset), some of its CHPID-specified channels may not be usable by the requesting OS, due to being busy with other devices, or merely not being currently operational. When a channel is found available, it is assigned as the currently selected channel path to the device represented by the SCB or SSCB.

Enabled bit, E, indicates whether I/O operations may be performed by the image represented by this SSCB. The E bit value may be different for the different SSCB images in the same sharing set.

I/O Interruption subclass code, ISC, indicates the interrupt subclass used for an I/O interruption provided for the image represented by this SSCB. The ISC values may be different for the different SSCB images in the same sharing set.

Logical Path Mask, LPM, indicates the logical availability of the channels specified by the CHPIDs in the SSCB for accessing the I/O device specified by the subchannel number in the SSCB. The LPM field value may be different for the different SSCB images in the same sharing set.

Path Available Mask, PAM, has 8 bits which respectively indicate the physical availability of each of the installed channels specified in the CHPIDs 1-8 fields in the SSCB for use by the I/O device specified in the subchannel number field. The PAM field value may be different for the different SSCB images in the same sharing set.

A DB (device busy) field indicates whether the last request in the current logical channel path for this SSCB has encountered any device busy condition for which a device end condition has not yet been received. The DB field value may be different for the different SSCB images in the same sharing set.

An allegiance field, ALLEG, indicates for the currently assigned channel path for this SSCB image which, if any, of the following allegiance states apply: 0. no allegiance, 1. active allegiance, 2. dedicated allegiance, or 3. working allegiance. The ALLEG field value may be different for the different SSCB images in the same sharing set.

These and other subchannel control fields provide the I/O subsystem with the capability of independently keeping track of each subchannel image's state and attributes. For example, items such as path selection management, path availability, device busy conditions, and allegiances can all be handled independently for each subchannel image within each sharing set.

Generally, the IID values in the SSCBs (and in any SCBs) are established at the time a I/O subsystem is initialized, or is reconfigured. When a software hypervisor is used with the CEC, control blocks associated with unshared subchannels (SCBs) are set to an IID value equal to zero, which allows the software hypervisor to control the I/O operations performed on these subchannels. But when a microcoded hypervisor is used with the CEC, control blocks associated with unshared subchannels (SCBs) are set to an IID value of an OS when a channel is varied online to that OS.

Further, if the same channel (CHPID) is specified in all SSCBs in a sharing set, that channel is shared by all OSs in the CEC for making a connection to the device represented by the sharing set of SSCBs. Thus, the IID assignments to all SSCBs in a sharing set enable all OSs in the CEC to share any channel specified by a CHPID found in all the SSCBs in the sharing set.

Isolation of Shared Channels and Shared Subchannels

Each of the OSs can operate a physical channel or a physical I/O device independently of the other OSs through the use of images of these channels and subchannels. No software coordination is required among these OSs in their use of the physical channels and I/O devices. All coordination among the OSs is automatically done through the image control blocks such as the CHCBs and SSCBs, and other image control blocks to be described herein.

The identification of control blocks with different IIDs enables the different OSs to independently issue subchannel related I/O instructions to the same shared I/O device through shared channels without physical interference among the OSs, and with the information transmitted for each each OS being completely secure from the operations done with the same physical transmission media by the other OSs. It must be understood that information residing on a shared I/O device is the responsibility for each OS to make secure from other OSs.

Although the different OSs view the same subchannel numbers, (same I/O device identifiers) and same CHPIDs (channel identifiers) in the sharing sets, no OS can access the channel or subchannel image associated with another OS, because locating any channel image or subchannel image requires an IID value not viewed by the OSs (no OS has access to the IID values), and can only be accessed by the hypervisor, CPUs, and I/O subsystem. Accordingly, the lack of access to the IID values, and the inability of the OSs to access the I/O subsystem control blocks is enforced by putting the IIDs in control blocks in storage media that are not addressable by any OS executed instruction, which prevents any operation by one OS from interfering with the operations of any other OS.

Address Generation for SSCBs and SCBs

The address of a required SSCB or SCB is obtained by the microcode executed for an OS instruction requesting an I/O operation. The SSCBs in FIG. 11 are in the storage of the I/O subsystem, which is not addressable by OS executed instructions (which in this embodiment are in the system area of an IBM S/390 compatible system). An SSCB is accessed by generating a storage address given a subchannel number and an IID value.

The address of a required SCB or SSCB can be determined by: multiplying its subchannel number by the size of each SCB or SSCB and adding this result to the proper base address. There is a single proper base address which is used for all SCBs, and there are multiple base addresses (one for each IID provided in the CEC) that are used for SSCBs. The proper base address for a SSCB is the one which corresponds to the IID field in the SSCB. In the preferred embodiment, all the base addresses are calculated at the time the I/O subsystem is initialized. This makes the calculation of a SCB or SSCB address much faster than if the base address were to be calculated each time it is needed. The calculation of the base addresses is dependent on whether a single, continuous range of storage addresses are used for all SCBs and SSCBs or whether multiple, continuous ranges of storage addresses are used for the range of SCBs and ranges and SSCBs associated with different IIDs.

Address Generation for CHCBs and LCUCBs can be done in a manner similar to SCBs/SSCBs. For CHCBs, it is a CHPID and IID which uniquely identify a CHCB. For LCUCBs, it is a LCUCB number and IID which uniquely identify a LCUCB.

Expansion of the Number of Channels and Subchannels

The invention can expand the effective number of available channel and subchannel images in a CEC far beyond the maximum number provided by the largest number available from the number of bits in the CHPID and subchannel number values. The maximum number of channel images available to a CEC is equal to the maximum number of channels multiplied by the number of IIDs in the CEC. And, the maximum number of subchannel images available to a CEC is equal to the maximum number of subchannels multiplied by the number of IIDs in the CEC. This occurs because each CHPID and each subchannel number is replicated for each IID value.

Use of Dynamic Switch

Referring to FIGS. 16A and 16B, a physical channel 65 may or may not be connected through a dynamic switch 62 to a physical CU 60 (where plural logical CUs may exist within the physical CU). If the channel is connected to switch 62, the physical channel path is considered a physical channel link 63 between the CEC I/O subsystem and switch 62; and then a physical control unit link 61 connected between switch 62 and the physical CU.

If switch 62 is not used, the physical channel path is considered the physical channel link between the CEC I/O subsystem and the physical CU (where plural logical CUs may exist within the physical CU).

FIG. 16B shows dynamic switch 62 connected to the physical channel links 63-0 through 63-P of physical channels 65-0 through 65-P. Control unit (CU) ports of switch 62 are connected to physical CU links 61-0 through 61-L which connect to ports of a physical CU box 60. Plural logical CUs exists within physical CU box 60, each of which is able to use all the ports of the physical CU box. CU box 60 connects to physical I/O devices A-E through Y-Z. (FIGS. 16A and 16B together show an integrated embodiment of the invention having different types of control blocks providing various types of IID-associated images representing OS-shared channels, devices and logical control units.)

Logical Control Unit Images (LCUCBs)

A physical control unit (physical CU) is an entity generally found in an electronic box, or on card(s) and/or chip(s) within a box, to control the operation of one or more connected I/O devices, such as DASD, tape, printer, display, etc.

The ESCON I/O Interface architecture provides for a plurality of logical control units (logical CUs) to exist within a physical CU. A logical CU provides the functions and has the logical appearance of a control unit. When plural logical CUs do not exist within a physical CU, a single logical CU is said to exist in the physical CU. Logical CUs within a physical CU can be of the same general type (e.g. for control of DASD) or of different general types (e.g. one for control of DASD, another for control of printers, etc).

Each of the logical CUs within a physical CU may use all of the ports which exist for the physical CU. A logical CU is uniquely identified within a physical CU by the logical CU address which is included in the frame header sent from a channel to a logical control unit and in the frame header sent from a logical control unit to a channel.

The information and controls in the I/O subsystem related to a logical CU is kept in a LCUCB. The I/O subsystem identifies a LCUCB by the use of a logical CU identifier (LCUCB number).

This invention provides a set of logical CU images for each logical CU by means of a "sharing set" of LCUCBs. The LCUCBs in a sharing set are respectively assigned to different IIDs (representing different OSs). This enables up to all OSs in a CEC to share the same logical CU because information and controls related to the logical CU (such as information and controls related to logical paths between channel images and the logical CU) are maintained separately for each image of the logical CU.

Each LCUCB is a sharing set has the same LCUCB number and is uniquely identified by the combination of a LCUCB number and an IID. FIG. 13 shows an example an array of LCUCBs, similar to the arrays of CHCBs and SCBs/SSCBs shown in FIGS. 8 and 11, respectively. The LCUCBs in the array are arranged by LCUCB number 0-K in the vertical direction, and by IID numbers 0-N in the horizontal direction.

FIG. 16A also shows sharing sets of of LCUCBs 67-0(0)–67-0(N) through 67-K(0)–67-K(N), in which all LCUCBs are in sharing sets (no unshared LCUCB is used). In FIG. 16A, each sharing set of LCUCBs, e.g. 67-0(0) through 67-0(N), is associated with one or more sharing sets of SSCBs. SSCB-A(0)–SSCB-A(N) is one such example of these sharing sets of SSCBs, and represents the same device 71A that is connected to the associated logical CU shown in FIG. 16B.

Structure of an LCUCB

FIG. 14 shows the content of each LCUCB shown in FIG. 13. The first row in the LCUCB contains a LCUCB number field for the number assigned to this LCUCB, an IID field for the IID assigned to the respective LCUCB, and a logical CU address field which identifies the logical CU within the physical CU. Each LCUCB is the header of a busy queue comprising SSCBs (and/or SCBs) currently enqueued on the busy queue and is used in locating the top and bottom elements in the queue. Thus, each LCUCB controls a queue of subchannel images currently function pending and delayed because of busy conditions.

The "V" field indicates if LCUCB is valid. V=1 indicates the LCUCB is valid. V=0 indicates that the LCUCB is not valid.

The "IID" field contains the IID assigned to the associated CU image.

The "logical CU address" field contains the logical CU address which identifies the logical CU within the physical CU.

The "LCUCB number" is the logical CU identifier for the I/O subsystem.

The "CU busy queue count field" contains the current length of the busy queue. The length of the queue is determined by the number of subchannel images on the associated busy queue that are function pending and delayed because of busy conditions.

Top and bottom pointer fields are for containing addresses of the top and bottom queue elements in the CU queue.

The "summation of queue counts" field adds the queue-count field to the summation at the time a subchannel image is added to the specified busy queue.

The "summation of enqueues" field contains an unsigned binary count of the number of times a subchannel image is added to the specified busy queue.

CHPIDs 0-7 are the same as the up to eight CHPIDs in each of the SSCBs for devices associated with the logical CU represented by the respective LCUCB.

Following the above defined fields within the LCUCB are eight subset fields, of which each subset is associated with a different one of the eight CHPID fields. Each subset contains the following fields:

Field B contains a busy indication for the associated logical CU image.

Field E indicates if a request exists for establishment of a logical path between the associated logical CU image and channel image.

Field R indicates if a request exists for the removal of a logical path between the associated logical CU image and channel image.

Field S indicates if a request exists for a device-level-system-reset between the associated logical CU image and channel image.

Field L indicates if a currently established logical path exists between the associated logical CU image and channel image.

The "physical channel link address" field, and the "physical CU link address" field can have their content combined with the contents of the preceding IID and logical CU address field to provide the identity of the logical path which could exist between the associated channel image and logical CU image.

A "switch busy count" field contains a count of the number of times an initial selection sequence for a start or halt function resulted in a switch-busy response on the corresponding logical channel path. Each switch-busy-count field corresponds one-for-one, by relative position, with the PIM bits of the subchannels associated with the logical CU.

The "CU busy count" field contains a count of the number of times an initial selection sequence for a start or halt function resulted in a control-unit-busy response on the corresponding logical channel path. Each control-unit-busy-count field corresponds one-for-one, by relative position, with the PIM bits of the subchannels associated with the logical CU.

The "success count" field contains a count of the number of times an initial selection sequence for a start function resulted in the device accepting the first command of the channel program on the corresponding logical channel path. Each success-count field corresponds one-for-one, by relative position, with the PIM bits of the subchannels associated with the logical CU.

Control Unit Logical Path Control Block (CULPCB)

A logical path must be established between a channel and a logical CU before communication to an I/O device attached to that logical CU can take place. This invention expands the identification of a logical path (LP) to include the IID corresponding to a channel image. Thus, a unique LP needs to be established between each image of a channel and a logical CU before communication to an I/O device attached to that logical CU can take place using each of the respective channel images. A single LP is uniquely identified by the combination of the physical channel link address, physical CU link address, IID, and logical CU address, with respect to either a physical channel or a control unit port.

The information and controls in an I/O control unit (CU) related to an established LP are kept in a "Control Unit Logical Path Control Block" (CULPCB). The number of CULPCBs which exist in the I/O control unit's storage determines the maximum number of LPs that a CU can have established at any one time. The maximum number of CULPCBs which exist in the I/O control unit's storage is open-ended since it may be a variable number.

When a channel image requests that a LP be established between the channel image and a logical CU (using the establish-logical-path procedure), the CU attempts to locate an available CULPCB which can be associated with the specified LP. A CULPCB currently associated with any other established LP is not considered available by the CU. If an available CULPCB can be located, the CU may respond to the channel image that the LP has been established. If an available CULPCB can not be located, the CU responds to the channel image that the LP has not been established. Once a LP is established, the CULPCB associated with this established LP is no longer available. The CULPCB may later become available if the established LP which the CULPCB is associated with is later removed.

A CULPCB associated with an established LP within a CU is identified by the same identifiers that identify a LP with respect to a control unit port. That is, a CULPCB is uniquely identified by the combination of a physical channel link address, physical CU link address, IID, logical CU address, and a control unit port identifier (CU port number). Once a CULPCB becomes associated with an established LP, that CULPCB becomes associated with the channel image, logical CU, and control unit port corresponding to the established LP.

An available CULPCB within a physical CU may be conditionally available for the establishment of a LP depending upon the identity of the logical path and/or control unit port. For example, a CULPCB may be restricted for association with a LP which is identified by a subset of logical CU address values which are valid within a physical CU.

FIG. 16B show an example of a physical CU 60 (packaged in a single box) having a plurality of logical CUs 60-0 through 60-K. Each logical CU may have a different plurality of CULPCBs associated with the logical CU. For example, logical CU 60-0 has associated with it CULPCBs 60-0(1) through 60-0(G) and logical CU 60-K has associated with it CULPCBs 60-K(1) through 60-K(H).

Structure of an LCUCB

FIG. 4 illustrates an example of the structure of a control unit logical path control block (CULPCB), which is provided in the hardware/microcode of a physical CU to represent a single LP which is established between a channel image and a logical CU.

In FIG. 4, the first row in the CULPCB contains all of the component identifiers for the CULPCB (which are also the component identifiers of the associated established LP and logical channel path). Each of the other rows in the CULPCB represents information about an I/O device connected to the associated logical CU, for example of I/O devices 71A through 71E connected to logical CU 0 (logical CU address =0) in FIG. 16B. The I/O information includes allegiance indicators for the I/O device as defined in the S/390 Principles of Operation (previously cited herein), a PGID (assigned for the I/O device by an OS), and model-dependent control fields tailored to the particular logical CU and device.

The PGID (multiple path group identifier) references a location in the CU storage that defines a set of logical channel paths selectable by the CU, given LPs are established, when responding to a requesting OS on behalf of an I/O device. The channel path group includes logical channel paths connecting the same operating system to the plurality of ports of a CU, and the group is assigned the PGID by an OS. Because this invention provides each OS with separate and unique logical channel paths to access a shared I/O device using shared channels, each OS may group together logical channel paths to a device using its own desired path-group identifier (PGID).

Image Reset

Prior to this invention, a logical resource partition reset command issued by the hypervisor to the I/O subsystem caused a reset of all controls for a logical resource partition along with a reset of all control units and devices connected via the logical paths associated with the logical resource partition. The command included a list of I/O subsystem resources dedicated to the logical resource partition rather than directly specifying the identity of the logical resource partition. The control units and devices were reset by issuing device-level-system-reset commands over only those established logical paths that were associated with the channels dedicated to the specified logical resource partition.

A logical resource partition reset command was issued, for example, when activating, inactivating, performing a system reset, or performing an initial program load (IPL) for the logical resource partition.

With this invention, an "image reset" command issued by the hypervisor to the I/O subsystem causes a reset of all controls for a specified IID along with a reset of all control units and devices connected via the logical paths associated with the specified IID. The control units and devices are reset, as for example when a system reset of a logical resource partition is performed, by issuing device-level-system-reset commands over only those established logical paths that are associated with the specified IID.

Novel to this invention is that the image reset command reinitializes only those controls for shared I/O resources within the I/O subsystem and control units which are associated with the specified IID. That is, only controls within SSCBs, LCUCBs, and CHCBs which are associated with the specified IID are reinitialized. SSCBs, LCUCBs, and CHCBs associated with other IIDs are not affected. Additionally, only controls within CULPCBs associated with established logical paths over which a device-level-system-reset command is received are reinitialized. Other CULPCBs are not affected.

When the hypervisor issues the image reset command, an indication is also included which specifies whether the target IID is to be placed in the activated state or inactivated state at the completion of the image reset command. The hypervisor specifies that the target IID be placed in the activated state, for example, when activating, performing a system reset, or performing an initial program load (IPL) for a logical resource partition. The hypervisor specifies that the target IID be placed in the inactivated state when inactivating a logical resource partition.

An activated IID is available for use by an OS. An inactivated IID is not available for use by any OS, although it may later be activated for use by an OS.

The configuration control block (CCB) shown in FIG. 9 is used by the I/O subsystem to control the current activated/inactivated state of each IID. When an image reset command is issued to the I/O subsystem, the bit corresponding to the target IID is set to one when the IID is to be placed in the activated state or is set to zero when the IID is to be placed in the inactivated state.

An activate/inactivate indication was not included with the logical resource partition reset command used prior to this invention. Instead, the I/O subsystem assumed that all logical resource partitions were always activated.

Novel to this invention is that the activate/inactivate indication included with the image reset command enables the I/O subsystem to remove all established logical paths associated with an inactivated IID because the I/O subsystem is now given the knowledge of which IIDs are activated and which IIDs are inactivated. It is important to remove established logical paths for an inactivated IID so that CULPCBs within the storage of I/O control units can be made available for the establishment of other logical paths.

When a previously inactivated IID is activated via the image reset command, the I/O subsystem attempts to establish all logical paths associated with the target IID. When a previously activated IID is inactivated via the image reset command, the I/O subsystem removes all logical paths associated with the target IID. When a previously activated IID is activated via the image reset command, the I/O subsystem sends device-level-system-reset commands over all established logical paths associated with the target IID in order to reinitialized controls within control unit's CULPCBs associated with the established logical paths.

The image reset command is part of both the Service Call Logical Processor (SCLP) instruction and Processor Controller CAll (PCCALL) instruction which passes a control block containing the target IID and activate/inactivate indication. This command is issued only by the hypervisor.

I/O Instructions

Most of the I/O instructions to the I/O subsystem use the SSCBs, CHCBs, LCUCBs, and CULPCBs.

Start Subchannel Instruction Example

Figure 17:
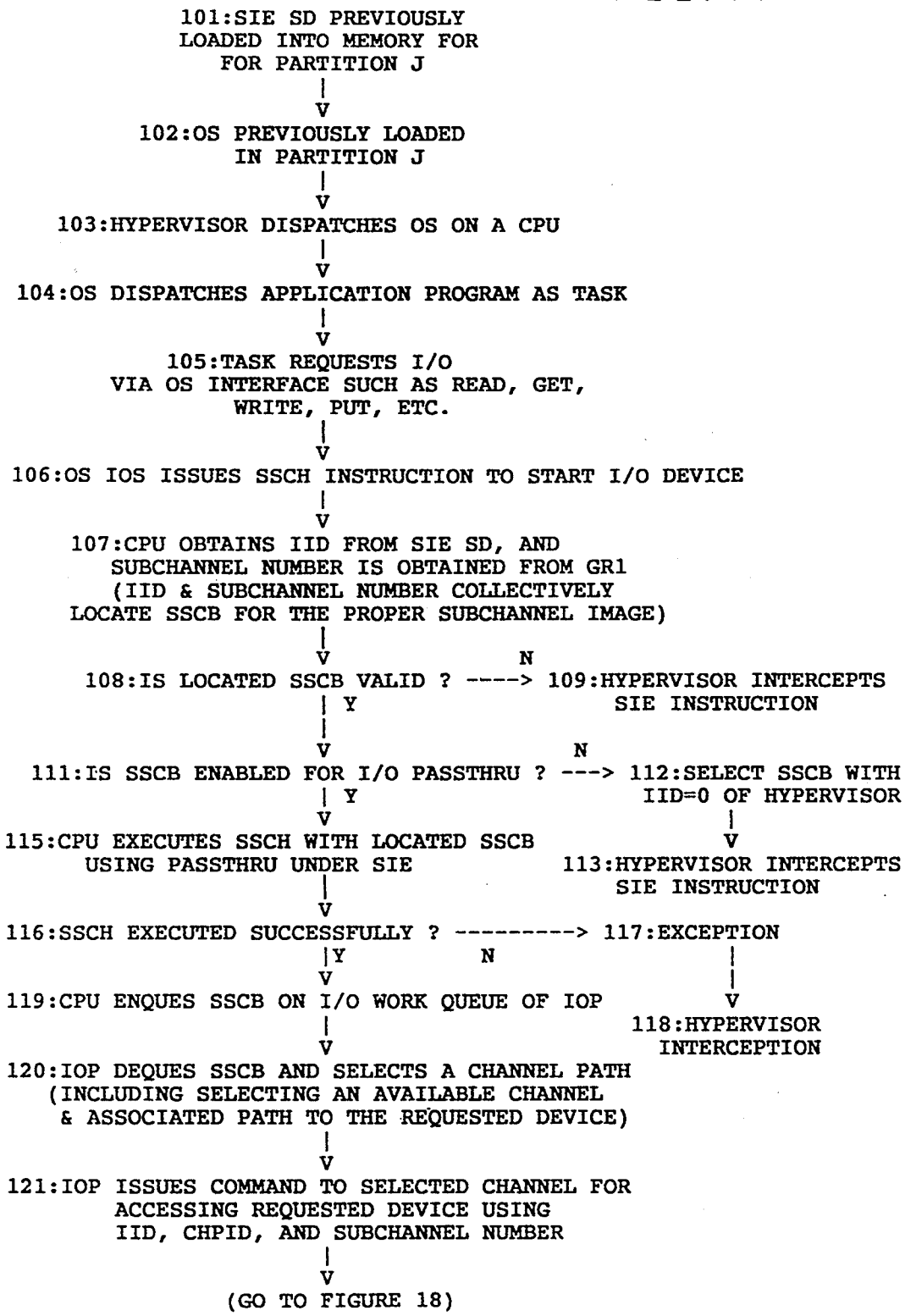
FIG. 17 and FIG. 18 provide a flow-diagram of a start subchannel instruction in the preferred embodiment.
Figure 18:
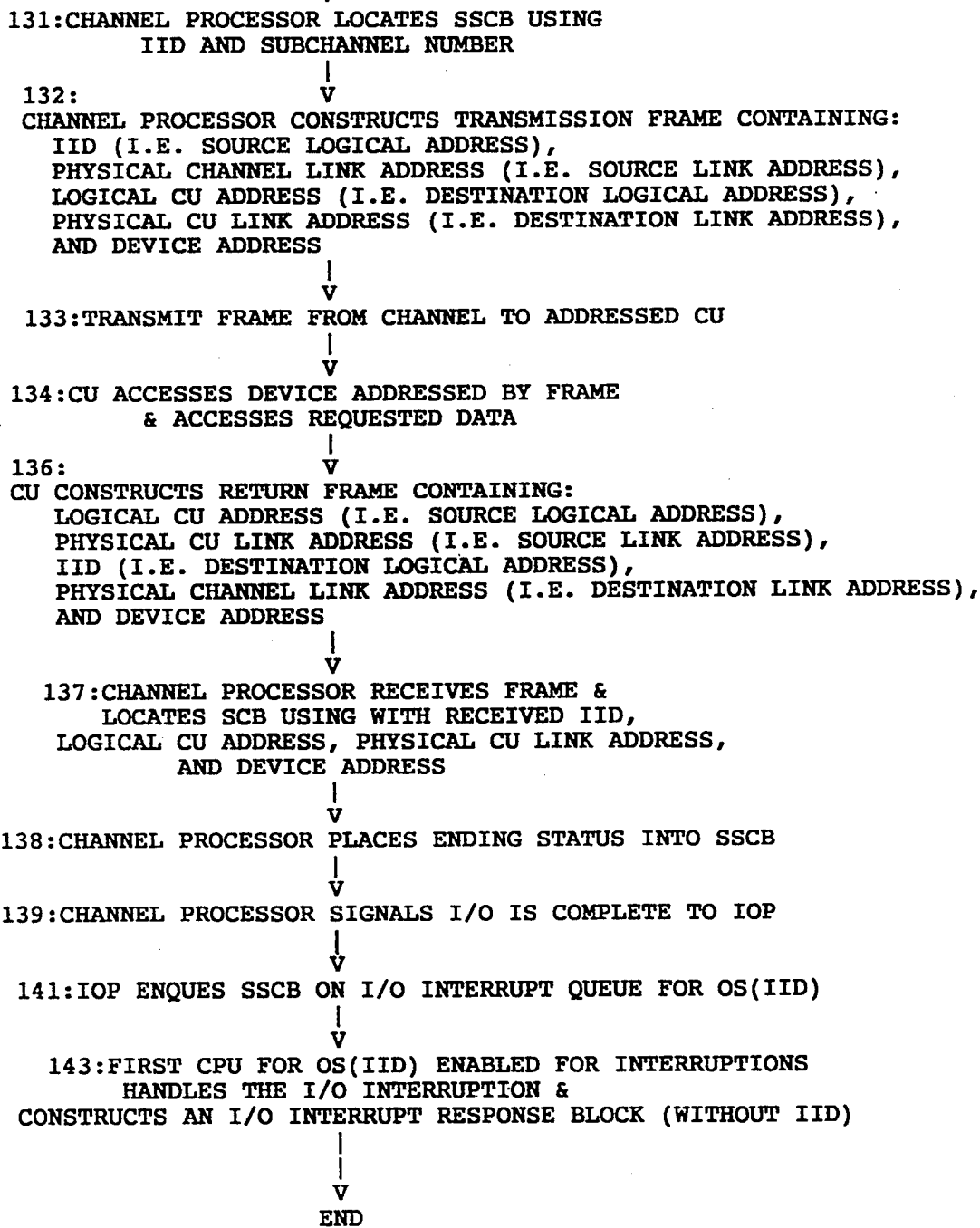

An example of an I/O instruction is shown in FIGS. 17 and 18, which provide a flow diagram of the execution of the S/390 "start subchannel" (SSCH) instruction. The SSCH instruction is issued by any operating system (OS) in the CEC in FIG. 1 executing in any resource partition and assigned an IID. The steps in the SSCH instruction execution are as follows:

101) Before an OS can use the invention on a CEC, a state description (SD) for the OS (shown in FIG. 6) is loaded into the memory of the CEC by the CEC hypervisor. The content of the SD defines resources for partition J and is assigned an IID value.

102) Step 102 loads the OS into the CEC memory assigned to resource partition J.

103) The OS is dispatched on a CPU in the CEC by the hypervisor.

104) The OS dispatches an application program as a task on the dispatched CPU.

105) The task requests an I/O operation of the OS by the task issuing an supervisor call (SVC) instruction, using application-to-OS program interface facilities such as a read, get, write, or put request.

106) The OS issues an SSCH instruction to start the I/O device to perform a requested operation.

107) CPU microcode responds to the SSCH instruction operation code by accessing the IID from the SD of the issuing OS and by obtaining the requested subchannel number from general register GR1. Then the microcode uses the IID and subchannel number to select a required SSCB in FIG. 12. This SSCB is the subchannel image used for the OS to access the desired I/O device.

108) The microcode tests the validity (V) bit and I/O interpretation control bit (INCB) in the SSCB to determine if it is a valid SSCB and whether it is operating in passthru mode, respectively. If the SSCB is valid and operating in passthru mode, the yes exit is taken to step 115. If the SSCB is not valid or is not operating in passthru mode, the no exit is taken to step 109.

109) Using the subchannel number from general register GR1 and an IID=0 (i.e. the hypervisor's IID), a second attempt is made to select a SSCB (in FIG. 12) which represents the desired I/O device. The microcode tests the validity (V) bit and I/O interpretation control bit (INCB) in the SSCB to determine if it is a valid SSCB and whether it is operating in passthru mode, respectively. If the SSCB is valid and operating in passthru mode, the yes exit is taken to step 115 (i.e. the hypervisor has setup the SSCB assigned to itself such that it can be used by an OS in passthru mode). If the SSCB is not valid or is not operating in passthru mode, the no exit is taken to step 113.

113) The hypervisor intercepts the execution of the SIE instruction for OS-J. The hypervisor may either terminate the I/O instruction with an unsuccessful condition code (CC) (e.g. when the selected SSCB is invalid) or may simulate the execution of the I/O instruction for OS-J (e.g. when the selected SSCB is not operating in passthru mode).

115) The CPU microcode accesses SSCB for OS-J to execute the synchronous portion of the SSCH instruction.

116) This step tests the SSCH instruction's condition code to determine if the CPU part of the SSCH instruction execution executed successfully, which involves the CPU microcode selecting an I/O processor (IOP). Using the information contained in the SSCB, the CPU performs the normal checks to determine which condition code (CC) to give to the SSCH instruction. If an unsuccessful CC is determined, step 117 is entered. If successful, step 119 is entered. 117) If the SSCH instruction's CC indicates the CPU did not execute it successfully, an exception is indicated which causes step 118 to be entered. 118) The hypervisor intercepts to determine why the CPU did not execute the SSCH instruction successfully, and takes action accordingly.

119) Then, the CPU enqueues the SSCB on the selected IOP's work queue contained in the I/O subsystem storage, and ends the CPU portion of the instruction. When the CPU executed the synchronous portion of the SSCH instruction successfully, an asynchronous portion of its execution begins with IOP operations on the work queue.

120) The work queue operates FIFO. An IOP dequeues the SSCB from the work queue when the SSCB rises to the top of the queue. Then, the IOP performs path selection by selecting a channel processor represented by one of the CHPIDs in the SSCB being used.

121) Once a channel processor is selected, the IOP issues a command to the channel processor to begin its I/O operations. The IOP command contains the IID of the SSCB, the CHPID, and the subchannel number in the SSCB. Then, step 131 in FIG. 18 is entered. 131) Channel processor receives the IOP command and calculates the address of the SSCB using the received subchannel number and IID.

122) Channel processor constructs an ESCON command frame to send to the director (when one exists) and to the control unit. FIG. 5 illustrates the frame header, which includes the address information. The header includes the fields shown in FIG. 5. The LP identifiers are obtained from a LCUCB. The LCUCB associated with the SSCB is located using the LCUCB number and IID in the SSCB.

123) The channel processor transmits the frame through the director (when one exists) to the addressed logical control unit.

124) The CU receives the frame, examines it, and accesses the I/O device addressed in the frame. The logical CU maintains its controls for the I/O operation in the CULPCB which is located using the identifiers in the frame header and the control unit port identifier over which the frame was received. (The combination of the source link address and source logical address identify the channel image which sent the frame. The combination of the destination link address and destination logical address identify the logical control unit which is the target of the frame. The device address identifies the particular I/O device on the logical control unit.) Any requested data is accessed by the addressed I/O device. The CU then sends a command acceptance frame to the channel, using the frame-sending procedure described below. In the preferred embodiment, the ESCON protocol is used to transfer the data associated with the command frame. If a write request, data transmitted in subsequent frames is written by the device. If a read request, data read by the device is sent back to the CU for placement in return frames the CU will send to the channel processor.

126) In order to send a frame to the channel processor, the CU constructs a returning ESCON frame to send to the channel, which has a frame header similar to that in FIG. 5, except the content of the destination and source parts of the frame header are reversed. (The source link address in the frame is set to the physical CU link address. The source logical address is set to the logical CU address. The destination link address is set to the physical channel link address. The destination logical address is set to the IID value. The frame also contains the I/O device's corresponding device address.)

127) The channel processor receives the frame and examines it. The combination of the destination link address and destination logical address identify the OS-J channel image which is the target of the frame. The combination of the source link address and source logical address identify the logical control unit which sent the frame. The device address identifies the particular I/O device on the logical control unit.

128) Using the destination logical address (][ID), source link address (physical CU link address), source logical address (logical CU address), and device address from the frame, the channel processor computes the address of the SSCB using a reverse lookup control block (RLCB). If the frame is a data frame, the data are stored in the program buffer. If the frame is a status frame, the channel processor places ending status in that SSCB.

129) After the status frame is received, the channel processor signals the IOP that the I/O operation is completed for this command, indicating the subchannel number and IID of the SSCB.

130) The IOP calculates the address of the SSCB using the subchannel number and the IID and places the SSCB on the bottom of an interruption queue for the interruption subclass indicated in a field of the SSCB. The interruption queue is contained in the I/O subsystem. This ends the IOP operations for the SSCH instruction. The interruption queue uses a FIFO structure. An interruption signal is sent to all CPUs in the CEC that the interruption is pending in an interruption queue.

131) The first CPU which is enabled for the I/O interrupt dequeues the SSCB from the interruption queue and constructs an interruption response block (IRB) in the system storage for OS-J when the I/O interruption takes place. The IRB contains the subchannel number but does not contain the IID.

Reset Channel Path Instruction

Another example novel to this invention is the "reset channel path" (RCHP) instruction, which prior to this invention reset all controls for the specified channel along with all control units and devices connected via the logical paths associated with the specified channel. With this invention, this instruction requires a specified IID and resets only those controls and logical paths associated with the channel image identified by the IID and CHPID.

Figure 19:
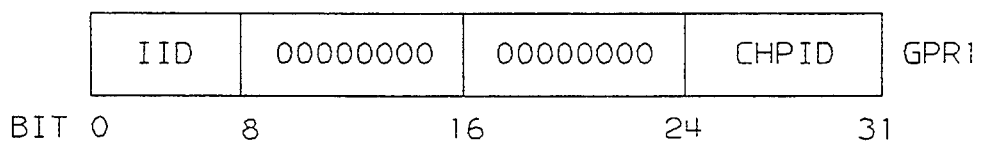
FIG. 19 shows the format of General Register 1 provided by this invention.

When an OS issues the "reset channel path" instruction, the target channel (CHPID) is specified in GPR 1. This instruction is not executed interpretively via the SIE instruction, but is intercepted by the hypervisor which in turn provides the IID assigned to the channel image in GPR 1 in addition to the CHPID before issuing the RCHP instruction to the I/O subsystem. FIG. 19 shows the format of GPR1 provided by this invention. The, combination of the IID and CHPID values specify the channel image as the target of the reset function.

The I/O subsystem resets controls for the specified channel image and issues device-level-system-reset commands only for those established logical paths that are associated with the specified channel image by building frame headers that include the specified IID. All other channel images and all other established logical paths are not affected. Further, the I/O subsystem resets the controls (busy indications and allegiances) in only those subchannel images (SSCBs) associated with the specified channel image. Controls in subchannel images (SSCBs) associated with any other channel images are not affected.

Channel Reports

Certain channel reports are presented to an OS to report information about either a channel or a subchannel. A channel report consist of one or more channel report words (CRWs) chained together. Prior to this invention, these channel reports were presented to a single OS since the channels and subchannels were not shared. With this invention a mechanism is provided to present these channel reports either to a single OS or to multiple OSs when sharing subchannels and channels.

In some cases the channel report applies only to one of the OSs sharing the channel or subchannel. In other cases, the channel report must be presented to all OSs sharing the channel or subchannel.

Figure 20:
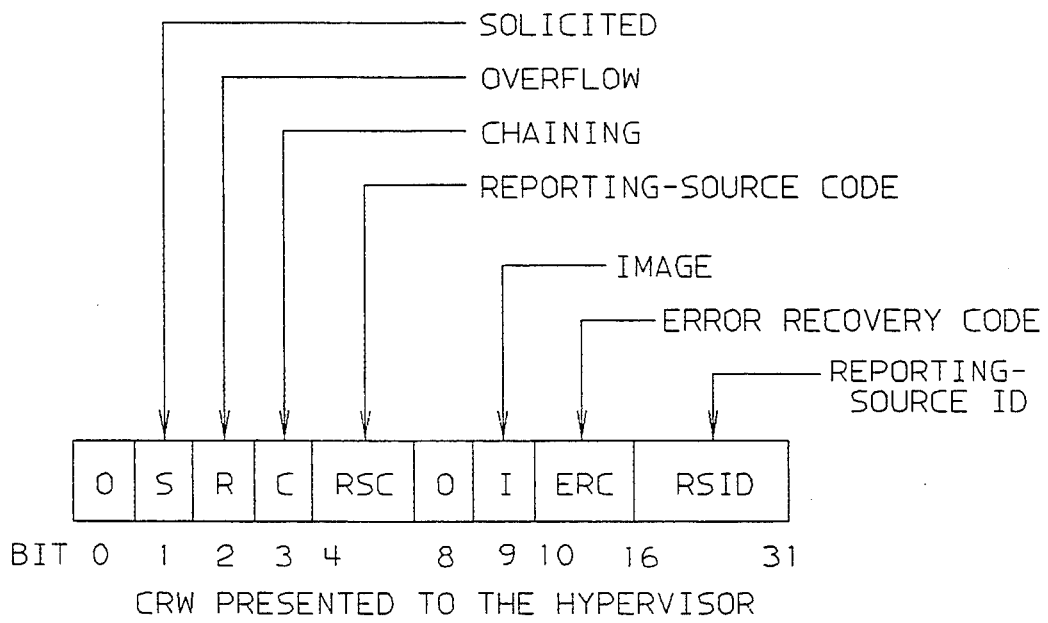
FIG. 20 shows the format of the channel report word as provided by this invention.

FIG. 20 shows the format of the channel report word as provided by this invention.

When the channel report applies to all OSs, the I/O subsystem presents the report to the hypervisor in the same way as was done prior to this invention. The Image (I) bit in the channel report word is set to zero. Novel to this invention, the hypervisor in turn presents this report to all of the OSs sharing the channel or subchannel. An example of this type of report is a permanent failure in the channel hardware.

When the channel report applies to only one OS, this invention provides a means for the I/O subsystem to pass the IID assigned to the image for which the report is intended along with the report. The Image (I) bit is set to one. Further the Chaining (C) bit is also set to one and an additional channel report word is chained to the original which provides the IID value in the Reporting-Source ID field. The hypervisor in turn presents this report only to the OS associated with the IID without the chained CRW containing the IID and without the I bit being set to one. An example of this report could be the result of a RCHP instruction issued by the same OS.

Channel Reconfiguration

Prior to this invention, a channel configuration command issued by an OS or by manual means caused the system to physically vary the target channel offline or online. A channel that is varied online to an OS is available for use by that OS. A channel that is varied offline is not available to any OS.

With this invention, a channel configuration command issued by an OS causes the I/O channel subsystem to vary offline/online only the channel image associated with the OS. The channel configuration commands are part of the Service Call Logical Processor (SCLP) instruction which passes a control block containing the target channel. This instruction is not executed interpretively via the SIE instruction, but is intercepted by the hypervisor. The hypervisor in turn provides the IID assigned to the image in the control block in addition to the CHPID before issuing the channel configuration command to the I/O subsystem. The combination of the IID and CHPID values specify the channel image as the target of the configure command.

The I/O subsystem resets controls for the specified channel image and either removes logical paths (for vary offline) or establishes logical paths (for vary online) only for those logical paths that are associated with the specified channel image by building frame headers that include the specified IID. All other channel images and all other established logical paths are not affected. Further, the I/O subsystem resets the controls (busy indications and allegiances) and either turns off the appropriate path availability bit (for vary offline) or turns on the appropriate path availability bit (for vary online) in only those subchannel images (SSCBs) associated with the specified channel image. Controls in subchannel images (SSCBs) associated with any other channel images are not affected.

Many variations and modifications are shown which do not depart from the scope and spirit of the invention and will now become apparent to those of skill in the art. Thus, it should be understood that the above described embodiments have been provided by way of example rather than as a limitation.

What is claimed is:

1. A method for sharing input/output (I/O) resources among a plurality of programs in a computer electronic complex, each of said plurality of programs assigned an image identifier, said method including the steps of:

storing in said computer electronic complex a sharing set of input/output control blocks, each input/output control block of said sharing set of input/output blocks including an input/output resource identifier and an image identifier;

accessing said sharing set of input/output control blocks in said computer electronic complex in response to an input/output request of one of said plurality of programs;

accessing a control block in said sharing set of input/output control blocks, accessed in the just previous step, with an image identifier of said one of said plurality of programs; and storing states of input/output resources in said control block accessed in the just previous accessing step, whereby said control block presents separate images of the input/output resources to each of said plurality of programs.

2. A method of sharing I/O resources by a plurality of programs as defined in claim 1, wherein said computer electronic complex includes a single operating system program with multiple categories of programs in which each category has one or more image identifiers assigned to it and including the steps of associating an image identifier with each executing program in each category and utilizing an identifier of the I/O resource to select a set of input control blocks and utilizing an image identifier associated with the program to select a required input control block in the required set to enable independent use of the I/O resource by programs in the different categories using different input control blocks in the set of the input control blocks.

3. A method of sharing I/O resources by a plurality of programs as defined in claim 1, wherein said computer electronic complex includes multiple operating systems in which each operating system has one category and each category has one or more image identifiers assigned to it and including the further step of utilizing an identifier of the I/O resource to select a required set of input control blocks and utilizing an image identifier associated with the program to select a required input control block in the requested set to enable independent use of the I/O resource by programs in the different operating systems using different input control blocks in the set of input control blocks.

4. A method of sharing I/O resources by a plurality of programs as defined in claim 1, comprising the steps of:

accessing the image identifiers and control blocks by means of internal code which is not accessible to the executing programs.

5. A method of sharing I/O resources by a plurality of programs as defined in claim 1, comprising the steps of:

accessing the image identifiers by means of system software used by a computer electronic complex hypervisor, and accessing the control blocks by means of internal code, in which the image identifiers and control blocks are not accessible to any programs executing in the computer electronic complex.

6. A method of sharing I/O resources by a plurality of programs as defined in claim 1, comprising the steps of:

provJding plural categories of programs in which a hypervisor is one of the categories.

7. A method of sharing I/O resources by a plurality of programs as defined in claim 1, comprising the steps of:

providing plural categories of programs in which operating systems (OSs) are one or more of the categories.

8. A method of sharing I/O resources by a plurality of programs as defined in claim 1, comprising the steps of:

communicating an I/O request directly from one of the programs to an I/O subsystem using at least one shared I/O resource without hypervisor intervention;

performing by the I/O subsystem of the I/O request using the shared I/O resource without hypervisor intervention; and responding to the requesting program without hypervisor intervention.

9. A method of sharing I/O resources by a plurality of operating systems (OSs), comprising the steps of:

storing an image identifier (IID) in a resource identifying control block (SD) for each of plural OSs operating in a computer electronic complex (CEC);

structuring within an I/O-control storage for the CEC of a set of I/O control blocks (CBs) for each of plural I/O resources of the CEC, and associating each CB in the set with a different IID; and accessing a required CB by an I/O processor for an I/O operation by selecting a set of CBs with an identifier of an I/O resource and by selecting a required CB in a selected set with the IID stored in the SD of an OS requesting the I/O operation, and sharing the I/O resource among the OSs associated with the IIDs of the different CBs in the set.

10. A method of sharing I/O resources by a plurality of operating systems (OSs) as defined in claim 9, further comprising the steps of:

assigning one of the IID values with a hypervisor of the CEC (instead of with any OS) to enable the hypervisor to have its respective image of the I/O resource to permit the hypervisor to use the I/O resource independently of any OS and concurrently with the OSs.

11. A method of sharing I/O resources by a plurality of operating systems (OSs) as defined in claim 9, further comprising the steps of:

structuring within an I/O-control storage for the CEC of a single I/O control block (CB) for any I/O resource and associating the CB with a hypervisor IID or an OS IID to provide a single image for an unshared I/O resource only to the hypervisor or OS, respectively, for enabling the hypervisor or OS, respectively, to control the unshared I/O resource in order to intermix CEC I/O operations for shared resources and for unshared resources, for which the OSs directly use shared resources without hypervisor intervention, and for which the hypervisor or the OSs can directly use unshared resources.

12. A method of sharing I/O resources by a plurality of operating systems (OSs) as defined in claim 9, further comprising the steps of:

setting states independently in different control blocks for the concurrently executing programs of different programs to enable independent control for the different programs over the I/O resource being shared by the OSs.

13. A method of sharing I/O resources by a plurality of operating systems (OSs) as defined in claim 12, further comprising the steps of:

communicating a representation of the IID of each I/O operation from the CEC to an I/O control unit (as the I/O resource for the I/O operation), and storing the representation of the IID by the I/O control unit to enable the I/O control unit to respond to the OS for the I/O request.

14. A method of sharing I/O resources by a plurality of operating systems (OSs) as defined in claim 13, further comprising the steps of:

responding by the I/O control unit to the CEC for the I/O operation by the I/O control unit accessing the representation of the IID stored for the I/O operation and signalling the representation of the IID to an I/O subsystem in the CEC;

selecting by the I/O subsystem of a required set of CBs for the I/O resource, and selecting a required CB in the set for the OS requesting the I/O operation with the I/O control unit; and queuing the required CB into an interruption queue for the OS requesting the I/O operation to enable a CPU executing the OS to handle the I/O interruption without any access to the IID to isolate the OSs from the IIDs and provide security of IIDs from the OSs.

15. A method of sharing I/O resources by a plurality of operating systems (OSs) as defined in claim 9, further comprising the step of:

resetting the state of an image of an I/O resource for an OS (represented by a CB of the I/O resource associated with a requested IID in the CEC) without affecting the state of any other CB for the same I/O resource or the state of any CB associated with any other I/O resource by accessing and setting to an initial state only the CB of the IID and resource identified to be reset.

16. A method of sharing I/O resources by a plurality of operating systems (OSs) as defined in claim 9, further comprising the step of:

resetting the state of CBs for all I/O resources (represented by all CBs of the I/O resources associated with a requested IID in the CEC) without affecting the state of I/O resources associated with any other IID by searching through the CBs of the CEC and setting to an initial state the CBs for all I/O resources found for the requested IID.

17. A method of sharing I/O resources by a plurality of operating systems (OSs) as defined in claim 9, further comprising the step of:

structuring within an I/O-control storage for the CEC of a sharing set of I/O control blocks (CHCBs) for each of a plurality of physical I/O channels (each physical I/O channel being the I/O resource for a set of CHCBs) and associating each CHCB in the set with a different IID to provide a different image of the physical I/O channel to each of the OSs for enabling independent control over each physical I/O channel by the OSs sharing the physical channel.

18. A method of sharing physical I/O channels and I/O devices among a plurality of operating systems (OSs) as defined in claim 17, further comprising the steps of:
- identifying in each CHCB of an offline/online field, and
- setting the offline/online field independently in each of the CHCBs in the sharing set to enable each of the OSs to independently control whether an associated image of the physical channel (provided by an associated CHCB) is online or offline.

19. A method of sharing I/O resources by a plurality of operating systems (OSs) as defined in claim 17, further comprising the step of:
- specifying a channel path identifier (CHPID) as an identifier of each physical channel, and the physical channel being the I/O resource for a sharing set of CBs.

20. A method of sharing I/O resources by a plurality of operating systems (OSs) as defined in claim 17, further comprising the step of:
- structuring within an I/O-control storage for the CEC of a single I/O control block (CB) for any physical I/O channel (the channel being the I/O resource for the single CB) and associating the CB with a hypervisor IID or an OS IID to provide a single image for an unshared physical channel only to the hypervisor or the OS, respectively, for enabling only the hypervisor or the OS, respectively, to control each unshared physical channel in order to intermix shared channels and unshared channels in a CEC for enabling any of the plurality of OSs to use shared channels without hypervisor intervention, and for which the hypervisor or the OSs can directly use unshared channels.

21. A method of sharing I/O resources by a plurality of operating systems (OSs) as defined in claim 9, further comprising the steps of:
- structuring within an I/O-control storage for the CEC of a set of I/O control blocks (CBs) for each of a plurality of subchannels in which each subchannel represents an I/O device (the subchannel being the I/O resource for the set of CBs), using an identifier of the subchannel as an identifier of the set of CBs, and associating each CB in the set with a different IID to provide a different image of each subchannel to each of the OSs for enabling independent control over each I/O device by each of the OSs.

22. A method of sharing I/O resources by a plurality of operating systems (OSs) as defined in claim 9, further comprising the steps of:
- structuring within an I/O-control storage for the CEC of a set of I/O control blocks (CBs) for each image of a I/O control unit (CU) connectable to the CEC (as one of the I/O resources) and associating each CB in the set with a different IID to provide a different image to the respective OSs of the CU for enabling independent control over the CU by each of the OSs.

23. A method of efficiently sharing I/O channels, I/O control units, and I/O devices by a plurality of operating systems (OSs), comprising the steps of:
- storing in processor storage one or more special control blocks (SDs) containing OS identifiers (IIDs) for use in I/O resource sharing operations of a computer electronic complex (CEC);
- storing in I/O storage a sharing set of subchannel control blocks (SSCBs) for each subchannel (for a shared I/O device), each SSCB in the set having a different IID;
- storing in the I/O storage of a sharing set of channel control blocks (CHCBs) for the same I/O channel (shared channel) in which each CHCB in the set has a different IID;
- storing in the I/O storage a sharing set of logical control unit control blocks (LCUCBs) for each logical I/O control unit in which each LCUCB in the set has a different IID; and
- controlling an I/O operation for a requesting OS by obtaining an IID for the OS and selecting an SSCB with the IID in a sharing set for a required subchannel I/O resource, and selecting a LCUCB with the IID in a sharing set for a required control unit I/O resource, and selecting a CHCB with the IID in a sharing set for a required channel I/O resource, thereby enabling the OS to share the required I/O channel and the required I/O control unit and the required I/O device with at least one other OS operating in the CEC.

24. A method of sharing I/O channels and I/O devices among a plurality of operating systems (OSs) as defined in claim 23, further comprising the steps of:
- generating by the CEC for the requesting OS of a frame header containing a specified logical path from the CEC through the required channel to a control unit associated with a device specified in the required subchannel, the logical path comprising: a representation of the IID of the requesting OS, an address for the required channel, an address associated with a required control unit (CU);
- transmitting the generated frame header to the CU using the available logical path; and
- storing in a CU storage of the logical path for use by the CU in later responding to the requesting OS regarding the I/O operation.

25. A method of sharing I/O channels and I/O devices among a plurality of operating systems (OSs) as defined in claim 24, further comprising the steps of:
- also storing in the CU storage of a group of addresses for logical paths associated with each of plural IIDs for the OSs in a CEC making I/O requests to the CU, and assigning a path group identifier (PGID) in the CU storage for each group of logical paths for each OS in the CEC with which the CU can communicate;
- recognizing by the CU of a need to provide a response to an OS for an I/O request made to the CU by the OS, and accessing by the CU of the PGID for the OS to access the group of logical paths for the OS in the CU storage;
- selecting in the CU storage of an available logical path in the accessed group of logical paths for the accessed PGID;
- generating by the CU of a responding frame header containing the available logical path for the accessed PGID containing a representation of an IID of the OS to receive the response;
- transmitting the responding frame header to the CEC using the available logical path; and
- selecting in the receiving CEC of a sharing set of SSCBs for the subchannel of the device having an address in the responding frame, and selecting of an SSCB in the sharing set with the representation of the IID in the logical path in the responding frame header.

26. A method of sharing I/O channels and I/O devices among a plurality of operating systems (OSs) as defined in claim 25, further comprising the steps of:

identifying in each SSCB of an interruption queue to be used by the SSCB of multiple subclass interruption queues provided in the CEC; and choosing for the queuing step of the subclass interruption queue identified in the selected SSCB.

27. A method of sharing I/O resources among a plurality of operating systems (OSs) as defined in claim 9, further comprising the steps of:

communicating by an I/O subsystem to a hypervisor of an occurrence of a special condition in the I/O subsystem, the communication including an IID and an identification of each resource affected by the special condition and an indication that a report about the special condition is to be forwarded to the OS assigned the IID; and forwarding by the hypervisor of the report containing information about the special condition to the OS.

28. A method of sharing I/O resources among a plurality of operating-systems (OSs) as defined in claim 9, further comprising the steps of:

communicating by mean of an I/O subsystem to a hypervisor an occurrence of a special condition in the I/O subsystem, the communication including an identification of each resource affected by the special condition and an indication that a report about the special condition is to be forwarded to each OS sharing the I/O resource; and forwarding by the hypervisor of the report containing information about the special condition to each OS sharing the I/O resource.

29. A method of sharing I/O resources among a plurality of operating systems (OSs) as defined in claim 9, further comprising the steps of:

activating a logical resource partition (LPAR) in the CEC for use by an OS with an image-reset command;

communicating to the I/O subsystem that the LPAR is to be activated; and establishing representations of logical paths (LPs) in the I/O subsystem and affected I/O control units for the LPAR being activated.

30. A method of sharing I/O resources among a plurality of operating systems (OSs) as defined in claim 9, further comprising the steps of:

inactivating a logical resource partition (LPAR) in the CEC with an image-reset command;

communicating to the I/O subsystem the IID of the LPAR with an indication the LPAR is being inactivated; and removing representations of logical paths (LPs) from the I/O subsystem and from affected I/O control units for the LPAR being inactivated.

* * * * *